(12) United States Patent
Spencer et al.

(10) Patent No.: US 11,422,689 B1
(45) Date of Patent: Aug. 23, 2022

(54) DETECTING TOUCH USER INTERFACE ON A DISPLAY UNDER PARTIAL WET CONDITIONS

(71) Applicant: Apple Inc., Cupertino, CA (US)

(72) Inventors: Maegan K. Spencer, La Honda, CA (US); Tyler S. Bushnell, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/100,077

(22) Filed: Aug. 9, 2018

(51) Int. Cl.
| | |
|---|---|
| *G06F 3/0488* | (2022.01) |
| *G06F 3/041* | (2006.01) |
| *G06F 3/044* | (2006.01) |
| *G06F 3/04817* | (2022.01) |
| *G04G 21/08* | (2010.01) |
| *G06N 20/00* | (2019.01) |

(52) U.S. Cl.
CPC ........... *G06F 3/0488* (2013.01); *G04G 21/08* (2013.01); *G06F 3/044* (2013.01); *G06F 3/0414* (2013.01); *G06F 3/04817* (2013.01); *G06N 20/00* (2019.01)

(58) Field of Classification Search
CPC ................ H03K 17/962; H03K 17/955; G06F 3/044–047; G06F 3/04812; G06F 3/04842; G06F 3/04817; G06F 2203/04101; G06F 2203/04103; G06F 2203/0414; G06F 2203/04105; G06F 2203/04111; G06F 2203/04112
See application file for complete search history.

(56) References Cited

U.S. PATENT DOCUMENTS

| | | | | |
|---|---|---|---|---|
| 8,818,794 | B2 * | 8/2014 | Archer | G06F 40/274 |
| | | | | 704/9 |
| 8,982,097 | B1 * | 3/2015 | Kuzo | G06F 3/04186 |
| | | | | 345/174 |
| 9,310,934 | B2 * | 4/2016 | Ng | G06F 3/0418 |
| 9,495,055 | B2 | 11/2016 | Yairi et al. | |
| 2008/0136792 | A1 * | 6/2008 | Peng | G06F 3/04186 |
| | | | | 345/174 |
| 2015/0002448 | A1 * | 1/2015 | Brunet | G06F 3/0445 |
| | | | | 345/174 |
| 2015/0212689 | A1 * | 7/2015 | Gomez-Rosado | G06N 5/02 |
| | | | | 715/765 |
| 2015/0268819 | A1 * | 9/2015 | Smoak | H04L 67/18 |
| | | | | 715/768 |

(Continued)

*Primary Examiner* — Dorothy Harris
(74) *Attorney, Agent, or Firm* — Dorsey & Whitney LLP

(57) ABSTRACT

An electronic device disclosed herein is adapted to determine a location of touch input when liquid is present. The electronic device may include a force detection assembly having force detection units. When a touch input is applied to the display layer, the force detection units generates a differential capacitance that is used to determine a location of the touch input. The electronic device may further include a confidence interval algorithm that uses the location and builds a confidence interval around the location. The electronic device may include a touch input components that can determine whether the liquid is present. The confidence interval algorithm determines whether the liquid is present within the confidence interval and provides an updated location of the touch input. The electronic device further includes a machine learning algorithm designed predict a software application the user intends to select using the touch input.

17 Claims, 14 Drawing Sheets

(56) References Cited

U.S. PATENT DOCUMENTS

| | | | |
|---|---|---|---|
| 2016/0036966 A1* | 2/2016 | Ka | G06F 3/04883 |
| | | | 455/566 |
| 2016/0117072 A1* | 4/2016 | Sharifi | G06F 3/04883 |
| | | | 715/769 |
| 2016/0259448 A1 | 9/2016 | Guarneri | |
| 2017/0329490 A1* | 11/2017 | Esinovskaya | G06F 3/0488 |
| 2017/0336891 A1* | 11/2017 | Rosenberg | G06F 3/0412 |
| 2018/0059866 A1* | 3/2018 | Drake | G06F 3/04186 |
| 2018/0074637 A1* | 3/2018 | Rosenberg | G06F 3/0418 |
| 2018/0157372 A1* | 6/2018 | Kurabayashi | A63F 13/422 |
| 2018/0173692 A1* | 6/2018 | Greenberg | G06F 3/04842 |
| 2018/0188938 A1* | 7/2018 | Deselaers | G06N 3/0454 |
| 2018/0307375 A1* | 10/2018 | Shah | G06F 3/0446 |
| 2019/0025939 A1* | 1/2019 | Patel | G06F 3/04817 |
| 2019/0042016 A1* | 2/2019 | Wang | G06F 3/044 |

* cited by examiner

DETECTING TOUCH USER INTERFACE ON A DISPLAY UNDER PARTIAL WET CONDITIONS

FIELD

The following description relates to electronic devices with touch input displays. In particular, the following description relates to portable electronic devices and wearable electronic devices with enhanced accuracy of touch input detection when the touch input display (or a transparent layer covering the touch input display) is wet.

BACKGROUND

Current electronic devices are known to include displays with touch input capability. Touch input technology may include multiple electrodes that form several capacitors that define an electrostatic field. When a user touches a region of the touch input display, the electrostatic field is altered, as determined by a change in capacitance, in that region. The electronic device can determine the location of the user's touch input based on the capacitance change.

The touch input display provides a dynamic user input that can alter the display. However, the performance of the display decreases when water is present. For instance, water can alter the electrostatic field by providing an electrical ground to the display. Some electronic devices deactivate the touch input component under these circumstances. Other electronic devices generate a false positive by inaccurately determining a touch input. Alternatively, ungrounded water on the display may cause the touch input display to be non-responsive to a touch input from a user. In either event, the touch input capability of the electronic device is limited to other input mechanisms, such as buttons.

SUMMARY

In one aspect, a wearable electronic device is described. The wearable electronic device may include a transparent layer. The wearable electronic device may further include a display assembly covered by the transparent layer. The display assembly may include a touch input component configured to receive a touch input at the transparent layer. The touch input component is capable of determining whether a liquid is in contact with the transparent layer. The wearable electronic device may further include a force detection assembly configured to determine an amount of force applied to the transparent layer from the touch input. The force detection assembly is capable of determining a first location of the touch input. The wearable electronic device may further include a memory circuit. The wearable electronic device may further include a confidence interval algorithm stored on the memory circuit and configured to generate a confidence interval around the first location. In some instances, when the liquid is at least partially within the confidence interval, a second location is determined based upon the first location, the second location being closer an actual location of the touch input than the first location.

In another aspect, a wearable electronic device is described. The wearable electronic device may include an enclosure. The wearable electronic device may further include a band coupled to the enclosure, the band configured to secure the enclosure with a user. The wearable electronic device may further include a display assembly i) a display layer configured to present icons that represent software applications, and ii) a touch input component that detects a user input to select an icon from the icons. The wearable electronic device may further include a confidence interval algorithm configured to build a confidence interval around a first location, determined by the touch input component, and evaluate a location of a liquid that covers the display assembly, the location of the liquid determined by the touch input component. In some instances, when the liquid is at least partially within the confidence interval algorithm, the location of the liquid is used as a second location of the user input. The wearable electronic device may further include a machine learning algorithm stored on a memory circuit carried by the enclosure. The machine learning algorithm is configured to predict a software application selected by a user from the software applications. Also, the machine learning algorithm capable of confirming that the second location provides an input to select the icon from the user input.

In another aspect, a method for selecting an icon on a display assembly of a wearable electronic device when a liquid is present on the display assembly is described. The method may include determining, by a force detection assembly, a first location of a touch input to the icon, the force detection assembly configured to detect an amount of applied force by the touch input. The method may further include determining, by a touch input component of the display assembly, whether the liquid is present on a transparent layer that covers the display assembly. The method may further include determining, by a confidence interval algorithm, a second location of the touch input, wherein the confidence interval algorithm uses the first location and a determination of the presence the liquid to determine the second location.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
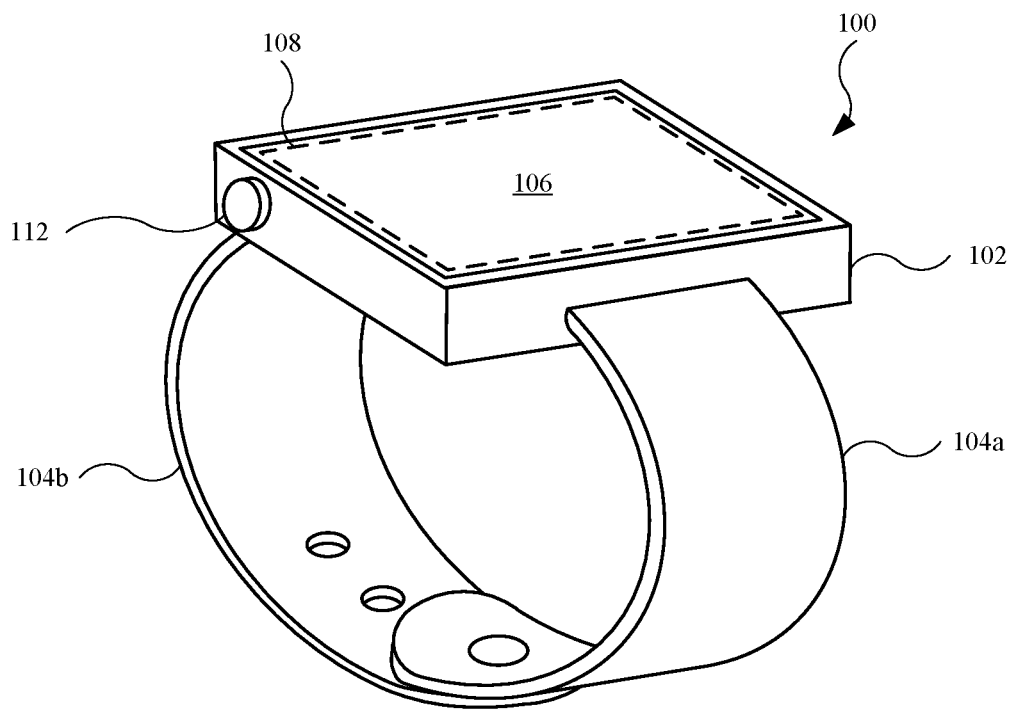
FIG. 1 illustrates an isometric view of an embodiment of an electronic device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to reliable user interface with a display of an electronic device when liquid is present on the display. Touchscreens, or displays with a touch input component, often use capacitive technology to detect the location of a touch input, or user input, to the touchscreen by measuring a change in electrostatic field caused by the touch input. In some cases, the liquid causes a change in the electrostatic field, regardless of whether the touch input is detected. As a result, the liquid reduces the ability of the touch input component to accurately detect the location of the touch input, and in some cases, the touch input component cannot detect the touch input at all. However, electronic devices described herein may include several enhancements to overcome these issues.

For example, electronic devices described herein may include a force detection assembly designed to detect an amount of force applied to the display by a touch input. The force detection assembly relies on a change in capacitance due to the change in distance between electrodes of the capacitors. The capacitance C can be determined by $$C = \frac{\varepsilon_0 \varepsilon_r A}{d}$$

where $\varepsilon_0$ is the permittivity of air, $\varepsilon_r$ is the permittivity of the dielectric material between the electrodes, A is the area of the electrode, and d is the distance between the electrodes. It can readily be determined by one of ordinary skill in the art that capacitance C is inversely proportional to the distance d.

The force detection assembly may include one or more (modular) force detection units. When multiple force detection units are used, a difference in detected capacitance among the force detection units may result from a touch input, and the difference is used to determine the location of the touch input. The electronic device can use the location information from the force detection assembly to determine the location of the touch input, even when the electronic device deactivates the touch input component due to the detected presence of liquid.

Alternatively, the touch input component can remain active under the presence of liquid. For example, in combination with the force detection assembly, electronic devices described herein may integrate the touch input component and use a confidence internal algorithm to more accurately identify a location of the touch input, thereby providing the electronic device with a greater confidence level that the determined touch input corresponds to the actual touch input. In an example scenario, when one or more liquid droplets are located on the display, the touch input component may register a potential touch input at each location of the liquid droplets. Using the force detection assembly, the confidence interval algorithm can generate a centroid, or center of mass location, that defines a center point of the touch input. This may be referred to as a touch input centroid or a user input centroid. The confidence internal algorithm can build a confidence interval around the touch input centroid, corresponding to an estimated region on the display in which the touch input by the user may have occurred. The confidence internal algorithm can determine which liquid droplet(s) are within (or at least partially within) the confidence interval and which liquid droplet(s) are not within the confidence interval. Using location information from the touch input component, the confidence interval algorithm can further create centroids for each liquid droplet that is determined to be at least partially within the confidence interval. This may be referred to as a liquid droplet centroid (or centroids). The confidence internal algorithm can then determine the distance (in a two-dimensional plane) from each liquid droplet centroid to the touch input centroid, and subsequently determine the location of the liquid droplet centroid that is closest to the touch input centroid. The electronic device can use the location information of the selected liquid droplet centroid to determine the location of the touch input, or at least an approximated location.

It should be noted that electronic devices described herein can distinguish the touch input centroid (determined by the force detection assembly) from the liquid droplet centroids (determined by the touch input component) not only by using the different sensing components, but also by the difference in applied force. Regarding the latter, an applied force associated with the user's touch input is substantially greater as compared to an applied force associated with liquid droplets. Moreover, the force detection assembly may be configured to require a threshold amount of applied force that is greater than an applied force commonly known for a liquid droplet (or droplets) such that the force detection assembly does not detect the liquid droplet(s).

In combination with the force detection assembly, the touch input component, and the confidence internal algorithm, electronic devices described herein may integrate a machine learning algorithm. The machine learning algorithm can access historical data of user preferences stored on the electronic device and predict a desired user request (to the electronic device) based on the historical data. As an example, when the user is selecting an icon (representing a software application) on the display, the machine learning algorithm can use location-based data to predict the software application intended for selection by the user based a current location of the user (more specifically, the current location of the electronic device). The predicted software application may include a software application most commonly used by the user at the current location, as determined by a ranking of software applications used at the current location. In another example, when the user is selecting an icon on the display, the machine learning algorithm can use time-based data to predict the software application intended for selection by the user based on a current time. The predicted software application may include a software application most commonly used at the current time (or an interval around the current time), as determined by a ranking of software applications used at the current time.

The machine learning algorithm may provide a confirmation that the location of the touch input, as determined by the force detection assembly or the confidence interval algorithm, is accurate. For example, when the machine learning algorithm predicts the software application corresponding to the icon that is selected by the touch input, the location of which is determined by the confidence interval algorithm, the electronic device can then determine, using the machine learning algorithm, that the intended software application to be opened is correct. Accordingly, the machine learning algorithm can provide the electronic device with a greater confidence level that the determined touch input corresponds to the user-intended selection of the software application.

These and other embodiments are discussed below with reference to FIGS. 1-23. However, those skilled in the art will readily appreciate that the detailed description given herein with respect to these Figures is for explanatory purposes only and should not be construed as limiting.

FIG. 1 illustrates an isometric view of an embodiment of an electronic device 100, in accordance with some described embodiments. As shown in FIG. 1, the electronic device 100 includes a wearable electronic device. For example, the electronic device 100 includes an enclosure 102, or housing, as well as a band 104a and a band 104b coupled to the enclosure 102. The band 104a may couple together with the band 104b to form a loop that secures around a user's appendage (such as a wrist) in order to secure the enclosure 102 (and more generally, the electronic device 100) to the user's appendage. The enclosure 102 may be formed from materials, such as steel (including stainless steel), ceramic, plastic, aluminum, or some combination thereof, as non-limiting examples. The enclosure 102 defines an internal volume designed to carry several components, such as a processor circuit, a memory circuit, a flexible circuit, a battery, a speaker module, and a microphone, as non-limiting examples.

The electronic device 100 may further include a transparent layer 106 coupled to the enclosure 102. The transparent layer 106 can provide a transparent protective cover for a display assembly 108 (shown as a dotted line). The display assembly 108 may include a display layer (not shown in FIG. 1) designed to present visual information in the form of motion images, still images, and/or textual information. The display layer may further present icons representing software application that can be executed and presented on the display layer. In order to interact with the display layer to change the visual information, the display assembly 108 may further include a touch input component (not shown in FIG. 1). This will be further shown below. Furthermore, the electronic device 100 may include an input mechanism 112 that represents a mechanical feature used to alter the visual information presented by the display layer of the display assembly 108. As shown in FIG. 1, the input mechanism 112 is a dial designed to rotate about an axis of rotation to alter the visual information, and can also be depressed and actuated toward the enclosure 102 to alter the visual information. Although not shown, the electronic device 100 may further include additional input mechanisms in the form of button and switches, both of which are mechanical features with which a user can interact.

Figure 2:
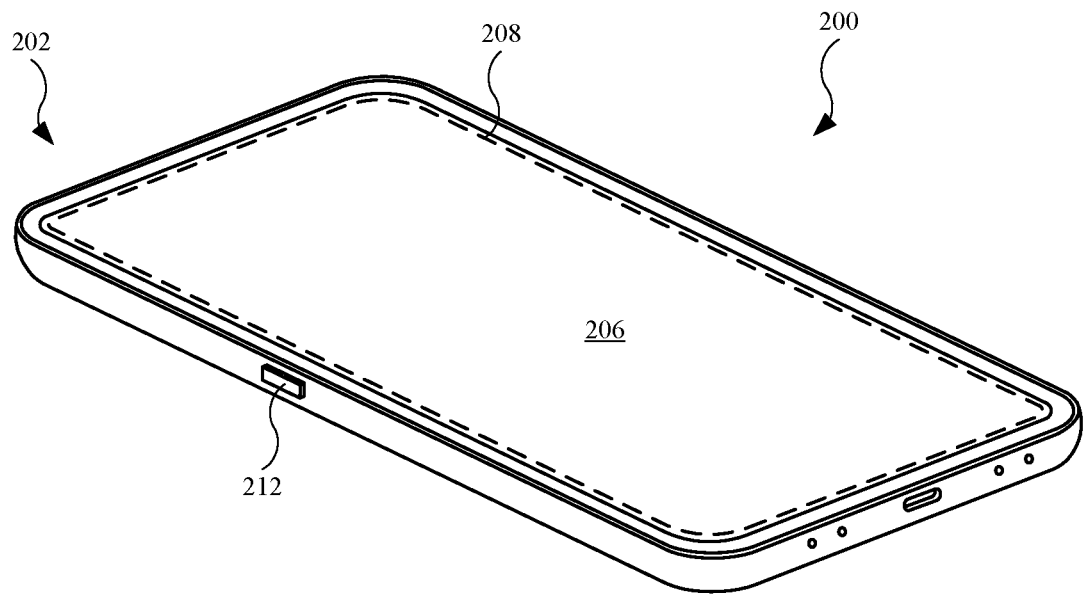
FIG. 2 illustrates an isometric view of an alternative embodiment of an electronic device, in accordance with some described embodiments.

FIG. 2 illustrates an isometric view of an alternative embodiment of an electronic device 200, in accordance with some described embodiments. As shown in FIG. 2, the electronic device 200 includes a mobile wireless communication device, such as a smartphone or a tablet computer. The electronic device 200 includes an enclosure 202, or housing. The enclosure 202 defines an internal volume designed to carry several components, such as a processor circuit, a memory circuit, a flexible circuit, a battery, a speaker module, and a microphone, as non-limiting examples. The electronic device 200 may further include a transparent layer 206 designed to provide a transparent protective cover. The electronic device 200 may further include a display assembly 208 (shown as a dotted line). The display assembly 208 may include display layer (not shown in FIG. 2) that is designed to present visual information in the form of motion images, still images, and/or textual information. The display layer of the display assembly 208 may further present icons representing software application that can be executed and presented on the display assembly 208. In order to interact with the display assembly 208 to change the visual information, the display assembly 208 may further include a touch input component (not shown in FIG. 2) and a force detection assembly (not shown in FIG. 2). These types of features for electronic devices will be further shown below. Furthermore, the electronic device 200 may include an input mechanism 212 that represents a button that can be depressed to alter the visual information presented by the display assembly 208. Although not shown, the electronic device 200 may further include additional input mechanisms in the form of button and switches, both of which are mechanical features with which a user can interact.

Figure 3:
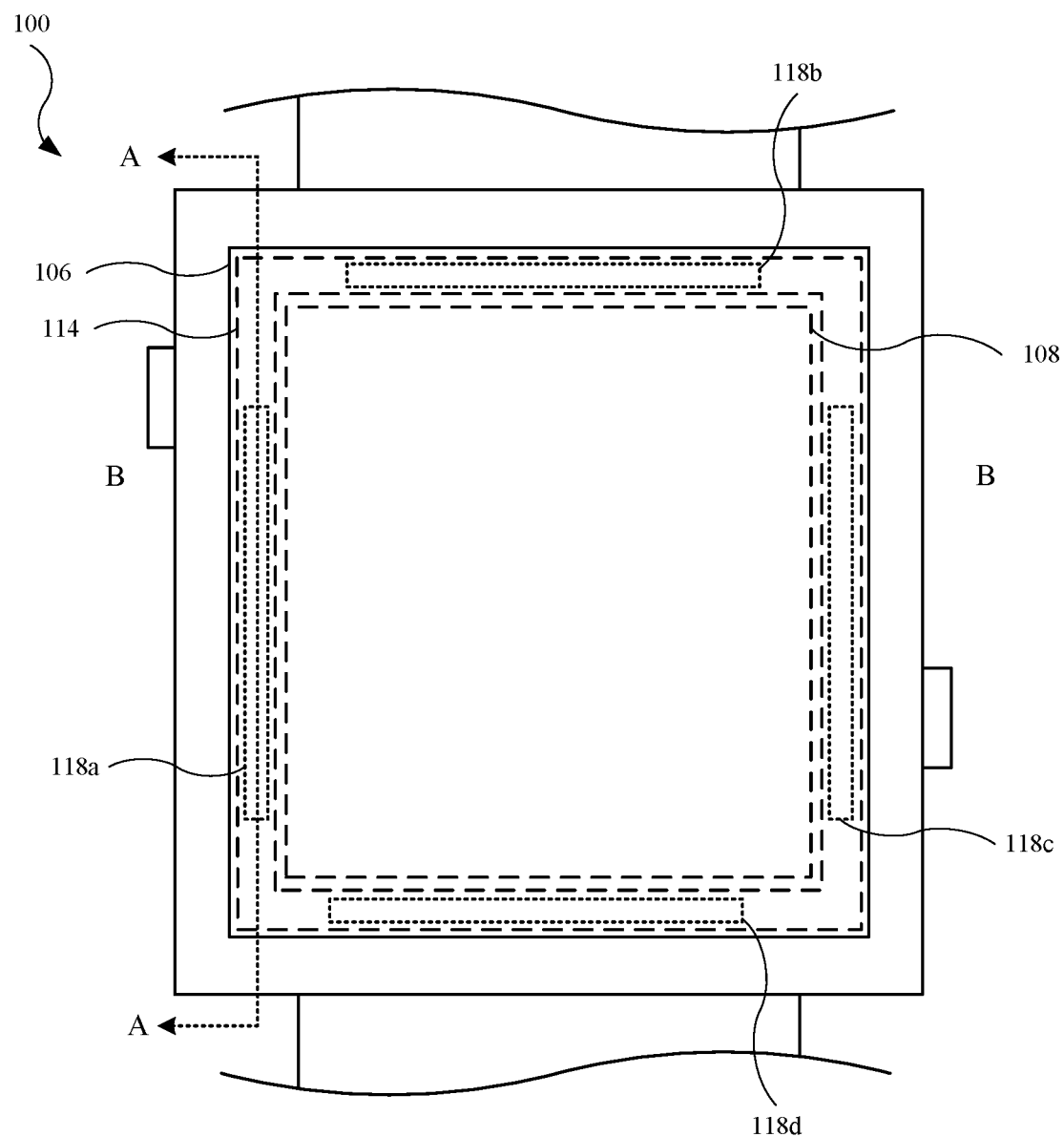
FIG. 3 illustrates a plan view that partially shows the electronic device in FIG. 1, further showing a force detection assembly.

FIG. 3 illustrates a plan view that partially shows the electronic device 100 in FIG. 1, further showing a force detection assembly 114. As shown, the transparent layer 106 covers the force detection assembly 114. In this regard, the force detection assembly 114 is designed to determine an amount of applied force to the transparent layer 106. In particular, the force detection assembly 114 is designed to determine an amount of applied force from a user while interacting with the display assembly 108 by, for example, depressing the transparent layer 106. While the a touch input component of the display assembly 108 and the force detection assembly 114 rely upon the user interacting with the display assembly 108, the touch input component of the display assembly 108 responds on a touch input by the presence of a user's finger (with minimal force required), while the force detection assembly 114 requires a threshold amount of applied force. In this regard, the electronic device 100 may include two distinguishable touch input events. The force detection assembly 114 may include multiple force detection units, such as a force detection unit 118a, a force detection unit 118b, a force detection unit 118c, and a force detection unit 118d. Each force detection unit may include a pair of electrode layers used to form several capacitors. When a user depresses, or touches, the transparent layer 106, the transparent layer 106 can move, thereby causing the distance between some electrode layers to change. The change in the distance between the electrode layers may cause a change in capacitance of the capacitors.

Figure 4:
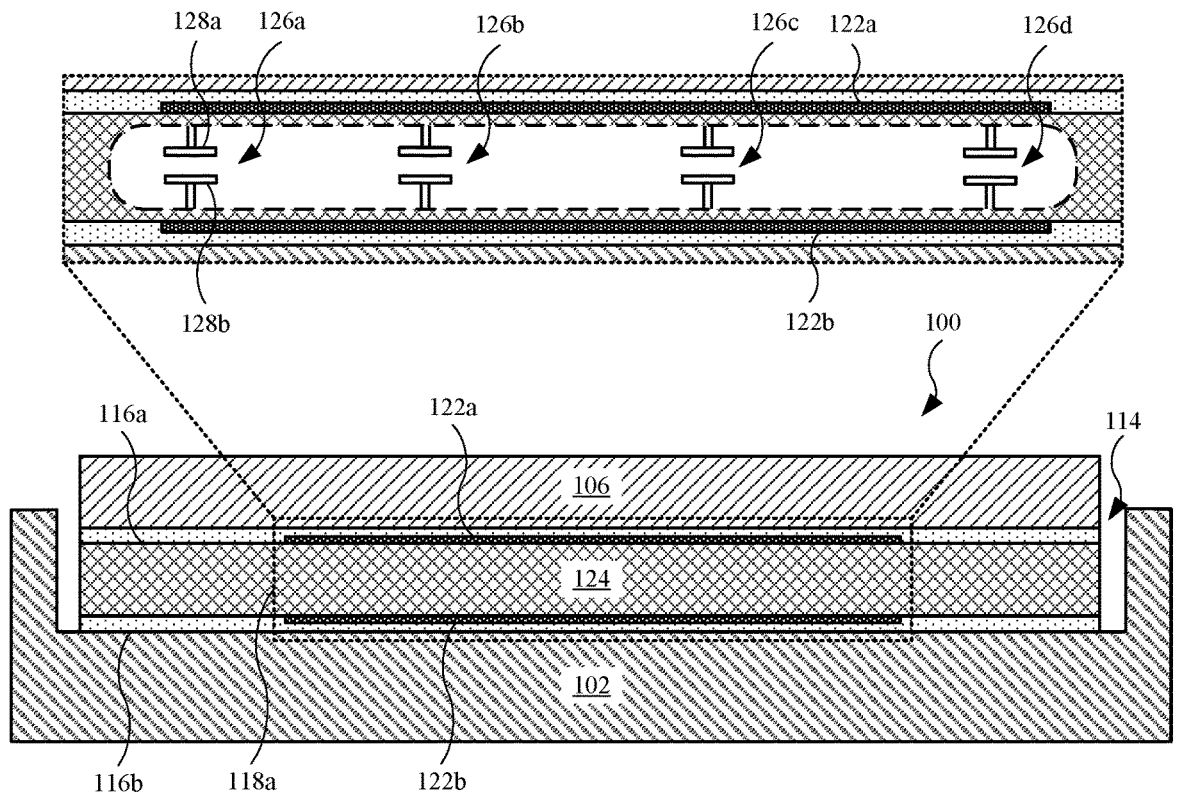
FIG. 4 illustrates a cross sectional view of the electronic device shown in FIG. 3 taken along line A-A, showing additional features of the force detection assembly.

FIG. 4 illustrates a cross sectional view of the electronic device 100 shown in FIG. 3 taken along line A-A, showing additional features of the force detection assembly 114. As shown, the force detection assembly 114 is secured with the transparent layer 106 and the enclosure 102 by an adhesive layer 116a and an adhesive layer 116b, respectively. A force detection unit 118a, representative of other force detection units, is shown. The force detection unit 118a may include an electrode layer 122a and an electrode layer 122b, with a dielectric material 124 separating the electrode layer 122a from the electrode layer 122b. The dielectric material 124 may include a compliant material, such as silicone, designed to compress in response to at least some forces applied to the transparent layer 106.

The aforementioned electrode layers of the force detection unit 118a may act as several capacitors. For example, as shown in the enlarged view, the electrode layer 122a and the electrode layer 122b may form a capacitor 126a, a capacitor 126b, a capacitor 126c, and a capacitor 126d. These capacitors may represent several additional capacitors of the force detection unit 118a. Also, each capacitor includes two electrodes plates. For example, the capacitor 126a includes an electrode plate 128a and an electrode plate 128b. A voltage differential may be applied between the electrode plate 128a and the electrode plate 128b, causing an electrostatic field between the electrode plate 128a and the electrode plate 128b. The remaining capacitors of the force detection unit 118a may include similar features.

Figure 5:
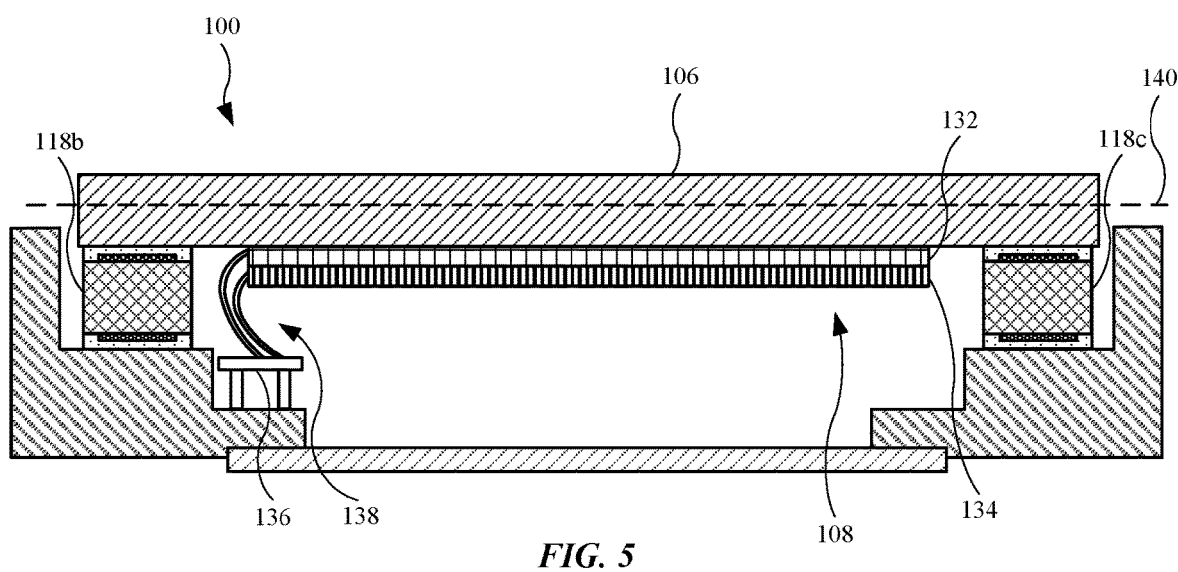
FIG. 5 illustrates a cross sectional view of the electronic device shown in FIG. 3 taken along line B-B, showing additional features of the electronic device.

FIG. 5 illustrates a cross sectional view of the electronic device 100 shown in FIG. 3 taken along line B-B, showing additional features of the electronic device 100. As shown, the display assembly 108 includes a touch input component 132 and a display layer 134. The touch input component 132 and the display layer 134 may include a rectangular shape similar to that of the transparent layer 106, and may cover a substantial portion of the backside of the transparent layer 106. Also, the touch input component 132 may cover the display layer 134. The touch input component 132 may include a touch sensitive layer. For example, the touch input component 132 may include an indium tin oxide ("ITO") applied to a back surface of the transparent layer 106. The touch input component 132 may use capacitive sensing technology that provides an electrostatic field. In this regard, when a user provides a touch input to the electronic device 100 to alter visual information on the display layer 134, the touch input component 132 responds by a change in the electrostatic field at a location corresponding to the touch input. The electronic device 100 may use the location of the changed electrostatic field to determine the location of the touch input.

The display assembly 108 is surrounded by a force detection unit 118b and a force detection unit 118c. As shown, the force detection unit 118b and the force detection unit 118c may include electrode layers (not labeled) designed to form several capacitors, in a manner similar to what is shown and described for the force detection unit 118a (shown in FIG. 4). Any additional force detection units may include similar properties and features. The touch input component 132 and the display layer 134 may electrically couple to a circuit board 136 by flexible circuits 138. During operation of the touch input component 132 and/or the display layer 134, the flexible circuits 138 may generate capacitance. However, the force detection unit 118b and the force detection unit 118c (as well as remaining force detection units) may undergo a calibration operation to adjust for the capacitance generated from the flexible circuits 138.

In FIGS. 4 and 5, the transparent layer 106 is horizontal, or at least generally parallel with respect to a horizontal plane 140 (shown in FIG. 5). As a result, the separation between the electrode layers (such as the electrode layer 122a and the electrode layer 122b) of the force detection units is the same, or least generally the same. However, when an applied force causes the transparent layer 106 to move such that the transparent layer 106 is no longer parallel with respect to the horizontal plane 140, the separation between some electrode layers can change. Moreover, the distance between the electrode layers at one location of a force detection unit may vary with respect to the distant between electrode layers at another location, causing a capacitance change that can be used by the electronic device 100 to determine a location of a touch input. This will be further shown and discussed below.

Figure 6:
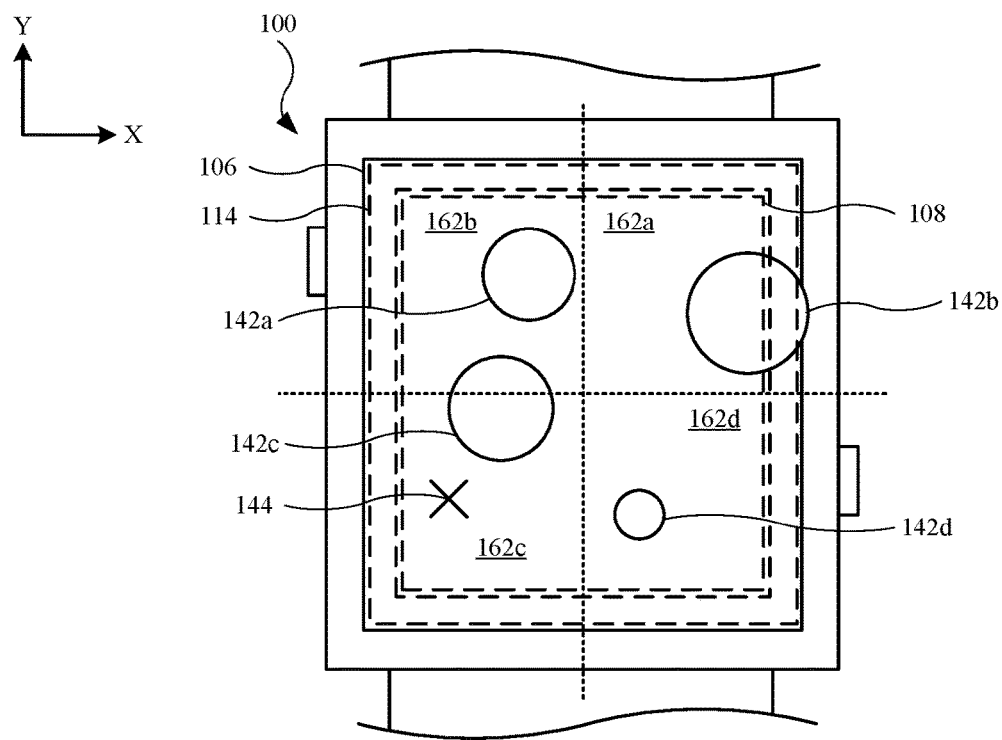
FIG. 6 illustrates a plan view that partially shows the electronic device, showing liquid droplets partially covering the transparent layer.

FIG. 6 illustrates a plan view that partially shows the electronic device 100, showing liquid droplets partially covering the transparent layer 106. As shown, a liquid droplet 142a, a liquid droplet 142b, a liquid droplet 142c, and a liquid droplet 142d are on the transparent layer 106. The liquid droplets may include an water-based liquid. Due to the presences of the liquid droplets on the transparent layer 106, the touch input component 132 (shown in FIG. 5) of the display assembly 108 may detect at least some of the liquid droplets and register the detected liquid droplet as touch inputs by a user. In this regard, the liquid droplets can result in false positives, and may obscure or limit the ability of the electronic device 100 to detect a location of the user input. However, in some instances, when the touch input component 132 (shown in FIG. 5) of the display assembly 108 detects a predetermined change in the electrostatic field associated with the presence of a liquid droplet (or droplets) on the transparent layer 106, the electronic device 100 may deactivate the touch input component 132 and use the force detection assembly 114 to determine a user input location. For example, a user input location 144 (denoted as an "x") represents a location of a user interaction, or touch input, with the display assembly 108, as determined by the force detection assembly 114. The process by which the force detection assembly 114 determines the user input location 144 will be described below.

Figure 7:
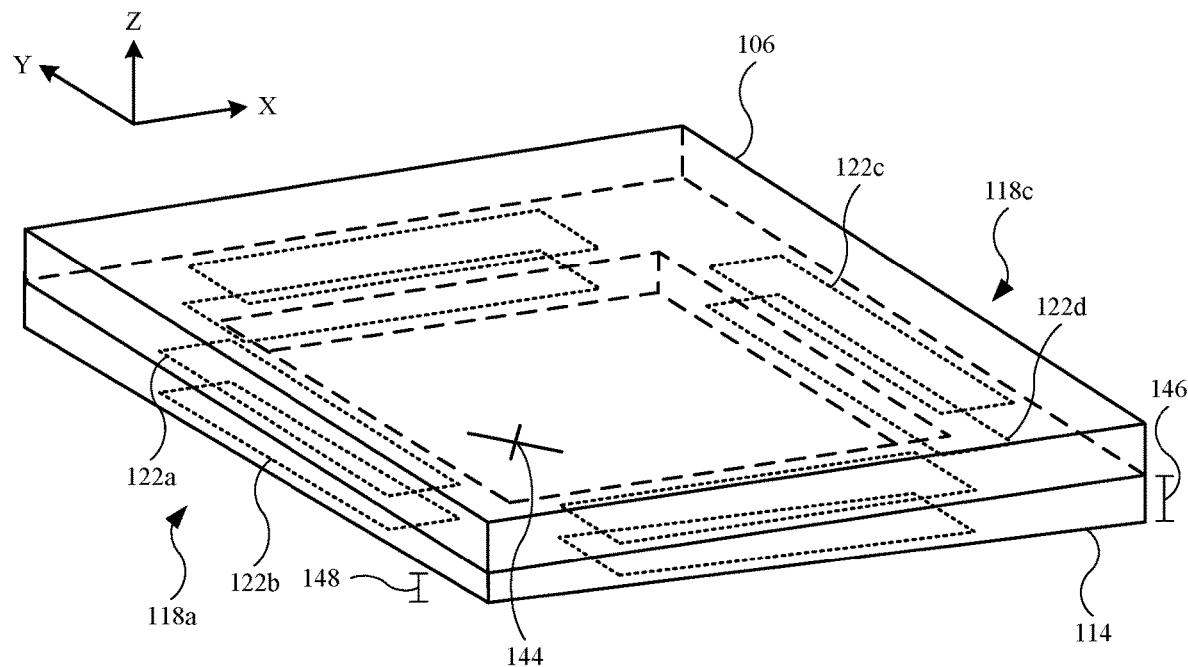
FIG. 7 illustrates an isometric view of the transparent layer and the force detection assembly, showing the force detection assembly responding to a touch input to the transparent layer.

FIG. 7 illustrates an isometric view of the transparent layer 106 and the force detection assembly 114, showing the force detection assembly 114 responding to a touch input to the transparent layer. When the applied force from the user input location 144 causes movement of the transparent layer 106, at least some of the applied force is transmitted to the force detection assembly 114. This is due in part to the transparent layer 106 being formed from a relatively rigid layer whereas the dielectric material of the force detection assembly 114 is formed from a compliant material. As a result, a corresponding movement of the force detection assembly 114 may occur. For example, the force detection assembly 114 (in particular, the dielectric material) may initially include a dimension 146 (or first height). Due to the applied force from the user input location 144, the force detection assembly 114 may also include a dimension 148 (or second height) that is less than the dimension 146. This is due to the user input location 144 being substantially closer to a corner of the force detection assembly 114 associated with the dimension 148.

As a result, the electrode layers of the force detection units may undergo relative movement. For example, FIG. 7 shows the electrode layer 122a and the electrode layer 122b of the force detection unit 118a. The electrode layer 122a is separated from the electrode layer 122b by a dimension, or gap, at one end (closer to the dimension 146) that is greater than the dimension between the electrode layer 122a and the electrode layer 122b at an opposing end (closer to the dimension 148). This may result in a difference in capacitance, or capacitance differential, across the electrode layers. Furthermore, as a result of the user input location 144, the dimension between electrode layers of different force detection units may differ. For example, the dimension between the electrode layer 122a and the electrode layer 122b is less than the dimension between an electrode layer 122c and an electrode layer 122d, with the electrode layer 122c and the electrode layer 122d being part of the force detection unit 118c.

Figure 8:
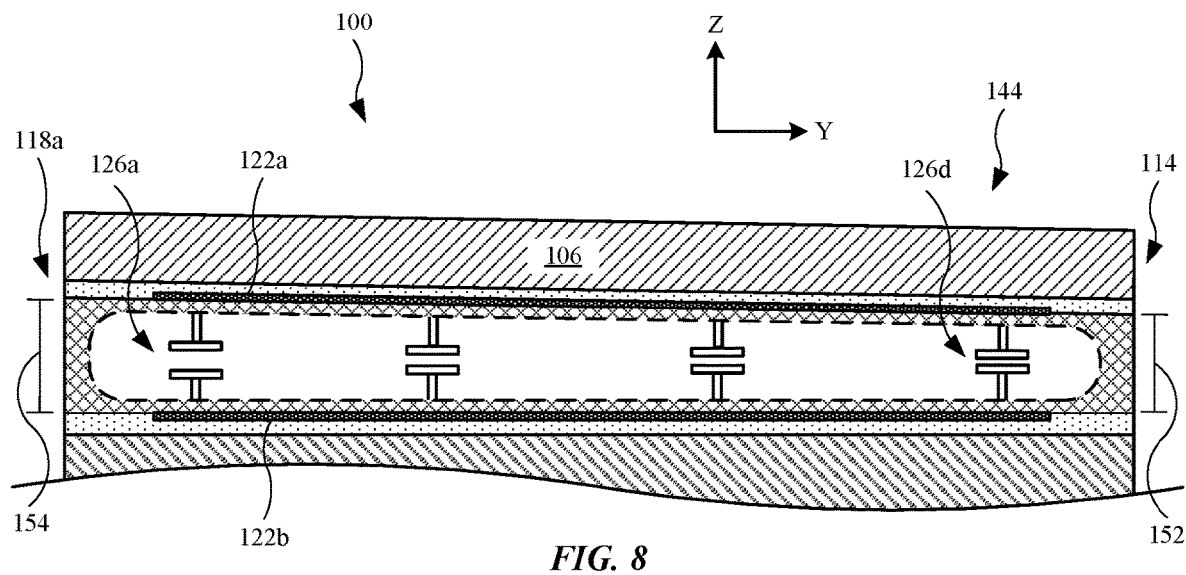
FIG. 8 illustrates a cross sectional view of the transparent layer and the force detection assembly shown in FIG. 7, showing a change in separation between the electrode layers of the force detection unit.

FIG. 8 illustrates a cross sectional view of the transparent layer 106 and the force detection assembly 114 shown in FIG. 7, showing a change in separation between the electrode layers of the force detection unit 118a. As shown, a distance 152 separates the electrode layer 122a from the electrode layer 122b at one end of the force detection unit 118a, while a distance 154 separates the electrode layer 122a from the electrode layer 122b at the other end of the force detection unit 118a. Due to the applied force from the user input location 144 being biased at one end of the transparent layer 106, the distance 152 is less than the distance 154. As a result, the distance between the electrode plates of the capacitors (formed by the electrode layer 122a and the electrode layer 122b) may be different in different locations of the force detection unit 118a. For example, the electrode plates of the capacitor 126a are further apart than the electrode plates of the capacitor 126d. Accordingly, for the same area of the electrode plates and the same applied charge to the capacitor 126a and the capacitor 126d, the capacitance of the capacitor 126d is greater than that of the capacitor 126a. Further, the capacitance between consecutive electrode plates gradually increases from the capacitor 126a to the capacitor 126d, due to the gradual decrease in distance between the electrode plates (as shown in FIG. 8). The electronic device 100 can use the capacitance information from the force detection unit 118a to determine a location, or at least an approximate location, of the user input location 144 along the Y-axis.

Figure 9:
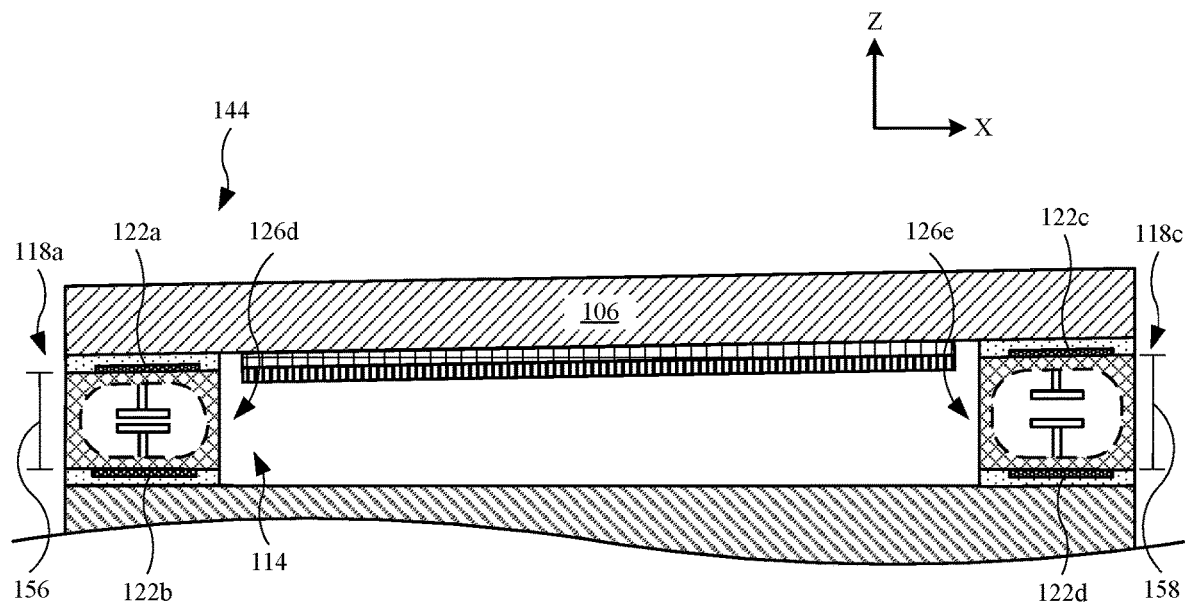
FIG. 9 illustrates a cross sectional view of the transparent layer and the force detection assembly shown in FIG. 7, showing a change in separation between the electrode layers of two separate force detection units.

FIG. 9 illustrates a cross sectional view of the transparent layer 106 and the force detection assembly 114 shown in FIG. 7, showing a change in separation between the electrode layers of two separate force detection units. As shown, a distance 156 separates the electrode layer 122a from the electrode layer 122b, while a distance 158 separates the electrode layer 122c from the electrode layer 122d. Due to the applied force from the user input location 144 being biased at one end of the transparent layer 106, the distance 156 is less than the distance 158. As a result, the distance between the electrode plates of the capacitors of the force detection unit 118a (formed by the electrode layer 122a and the electrode layer 122b) may be different than the distance between the electrode plates of the capacitors of the force detection unit 118c (formed by the electrode layer 122c and the electrode layer 122d). For example, the electrode plates of the capacitor 126e are further apart than the electrode plates of the capacitor 126d. Accordingly, for the same area of the electrode plates and the same applied charge to the capacitor 126d and the capacitor 126e, the capacitance of the capacitor 126d is greater than that of the capacitor 126e. Generally, given the location of the user input location 144, the electrode plates of capacitors of the force detection unit 118a are closer together than the electrode plates of the force detection unit 118c, and accordingly, the capacitance of a capacitor of the force detection unit 118a is greater than the capacitance of a capacitor of the force detection unit 118c. The electronic device 100 can use the differential capacitance information, between the force detection unit 118a and the force detection unit 118c, to determine a location, or at least an approximate location, of the user input location 144 along the X-axis.

FIGS. 8 and 9 show that capacitive information of a single force detection unit (such as the force detection unit 118a) can provide a location of the user input location 144 in one axis, while the differential capacitive information between two force detection units (such as the force detection unit 118a and the force detection unit 118c) can provide a location of the user input location 144 in another axis. Given the capacitive and differential capacitance information, the electronic device 100 force can determine a location of the user input location 144 along a two-dimensional (X-Y) plane using the force detection assembly 114. Although not indicated in the described example, capacitive information and/or differential capacitance information from the force detection unit 118b and/or the force detection unit 118d can further be used to more accurately determine the location of the user input location 144.

Referring to FIG. 6, the display assembly 108 can be divided into four quadrants, labeled as a quadrant 162a, a quadrant 162b, quadrant 162c, and a quadrant 162d. Based on the capacitance information obtained by the force detection unit 118a (shown in FIGS. 7 and 8), the electronic device 100 can determine the user input location 144 more likely located in the quadrant 162c, as compared to the quadrant 162a or the quadrant 162b. Further, based on the differential capacitance information between the force detection unit 118a and the force detection unit 118c (shown in FIG. 9), the electronic device 100 can determine the user input location 144 more likely located in the quadrant 162c, as compared to the quadrant 162a or the quadrant 162d. Taken together, the electronic device 100 can determine the user input location 144 is located in the quadrant 162c. Accordingly, the electronic device 100 can determine at least an approximate location of the user input location 144 without using the touch input component 132 (shown in FIG. 5) of the display assembly 108. This may be useful when liquid droplets area present on the transparent layer 106 and capable of causing false positive user inputs. It should be noted that the force detection assembly 114 may respond to locate the user input location 144 when the user input location 144 is in any of the remaining quadrants.

Figure 10:
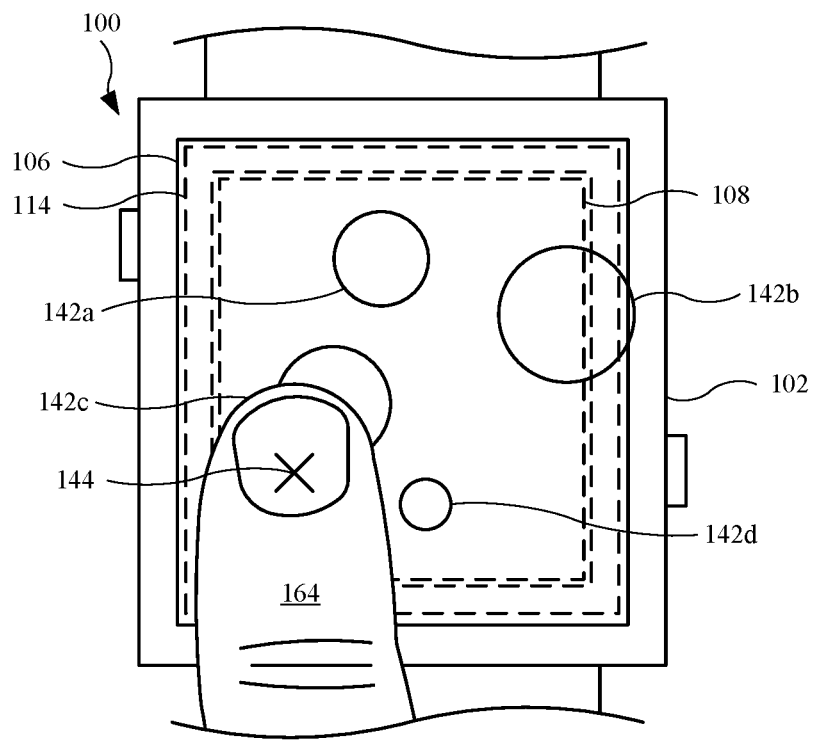
FIG. 10 illustrates a plan view that partially shows the electronic device, showing a user interacting with the electronic device, in accordance with some described embodiments.

FIG. 10 illustrates a plan view that partially shows the electronic device 100, showing a user 164 interacting with the electronic device 100, in accordance with some described embodiments. As shown, the liquid droplet 142a, the liquid droplet 142b, the liquid droplet 142c, and the liquid droplet 142d are present on the transparent layer 106. The liquid droplet 142a, the liquid droplet 142c, and the liquid droplet 142d may be detected by the touch input component (not shown in FIG. 10) of the display assembly 108, which can trigger a false touch input (or inputs). The liquid droplet 142b is in contact with the enclosure 102, and may provide an electrical ground (when the enclosure 102 includes an electrically conductive material), which can cause the display assembly 108 to incorrectly determine a touch input by the user 164.

To determine an initial location of the user input location 144, the electronic device 100 can use information from the force detection assembly 114, such as the capacitive and the differential capacitive information, in a manner shown and described above. In addition to the location information determined using the force detection assembly 114, the electronic device 100 may also use additional resources, such as the touch input component 132 (shown in FIG. 5) to determine the location of the user input location 144. In this regard, in some instances, the electronic device 100 may not deactivate the touch input component 132.

Figure 11:
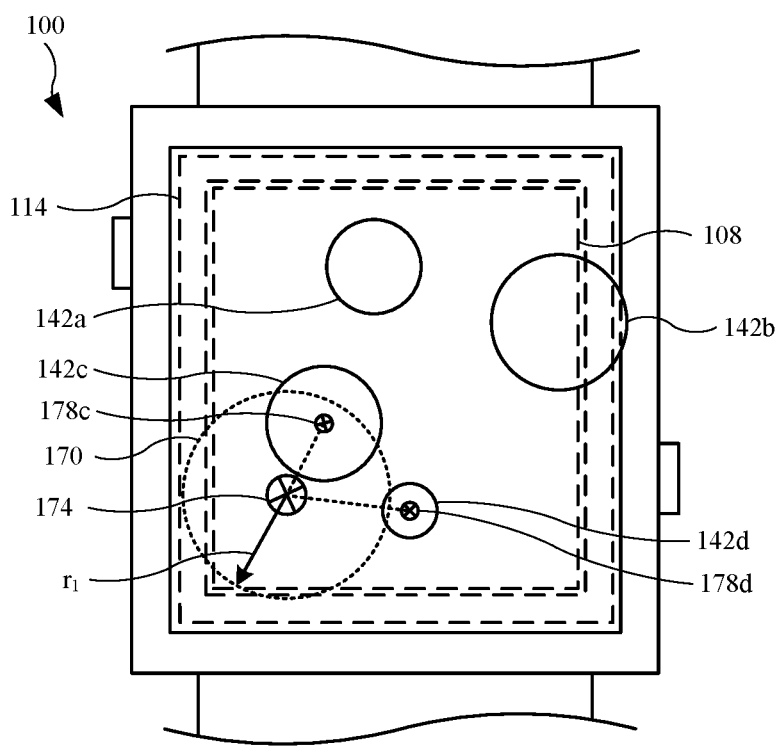
FIG. 11 illustrates a plan view that partially shows the electronic device, showing a confidence interval generated by an algorithm, in accordance with some described embodiments.

FIG. 11 illustrates a plan view that partially shows the electronic device 100, showing a confidence interval 170 generated by a confidence interval algorithm, in accordance with some described embodiments. The confidence interval algorithm is designed to use the location information of a user input, as determined by the force detection assembly 114, and provide an additional step to more accurately determine an actual location of the user input, or at least provide the electronic device 100 with greater confidence that the determined touch input corresponds to (or is aligned with) the actual location of the touch input. The confidence interval algorithm may include a set of instructions stored on memory circuit that is subsequently run by a processor circuit. These features will be discussed in a schematic diagram below. The confidence interval algorithm (and/or another program of the electronic device 100) can use the location of the user input location 144 (shown in FIG. 10), as determined by the force detection assembly 114, and create a user input centroid 174. In some instances, the force detection assembly 114 is used to create the user input centroid 174, or a combination of the force detection assembly 114 and the confidence interval algorithm is used. The user input centroid 174 may refer to a center of mass location of the user input location 144. Accordingly, the user input centroid 174 may generally define a central point of the user input location 144. The user input centroid 174 may define a centroid location for a touch input by a user.

The confidence interval algorithm may build a confidence interval 170 (circle shown as a dotted line) around the user input centroid 174 As shown, the confidence interval 170 includes a radius $r_1$ that extends from the user input centroid 174. The radius $r_1$ of the confidence interval 170 is based in part on the amount of applied force (as determined by the force detection assembly 114). For example, when the force detection assembly 114 determines a relatively high applied force by the user, the confidence interval 170 may include a smaller radius, as compared to the radius $r_1$. The relatively high force provides provide the electronic device 100 can create additional certainty that the user input location 144 (shown in FIG. 10) is correctly and accurately determined. This will be further shown below.

The electronic device 100 may use information from the touch input component (shown in FIG. 3) of the display assembly 108 to determine the location of the liquid droplets, and the confidence interval algorithm may determine whether the liquid droplets fall within the confidence interval 170. As shown, the liquid droplet 142c and the liquid droplet 142d at least partially fall within the confidence interval 170, while an outer perimeter of the liquid droplet 142a and the liquid droplet 142b do not fall within the confidence interval 170. As a result, the confidence interval algorithm can then determine that the liquid droplet 142c and the liquid droplet 142d are closer in proximity to the user input centroid 174, as compared to the liquid droplet 142a and the liquid droplet 142b. In this regard, the liquid droplet 142c and the liquid droplet 142d may define a subset of liquid droplets used by the confidence algorithm for further evaluation of the location of the touch input.

The confidence interval algorithm (and/or another program) can use location as well as the diameter of the liquid droplets, as determined by the display assembly 108, and create liquid droplet centroids for the liquid droplets that fall at least partially within the confidence interval 170. In some instances, the display assembly 108 is used to create the user input centroid 174, or a combination of the display assembly 108 and the confidence interval algorithm is used. The liquid droplet centroids may generally define a central point for each droplet. The liquid droplet centroids may define a centroid location for each liquid droplet. For example, the confidence interval algorithm may create a liquid droplet centroid 178c and a liquid droplet centroid 178d based on the location and diameter of the liquid droplet 142c and the liquid droplet 142d, respectively. Subsequently, the confidence interval algorithm can evaluate the distance from the user input centroid 174 to the liquid droplet centroids, and determine which liquid droplet centroid is closer to the user input centroid 174. As shown in FIG. 11, the liquid droplet centroid 178c is closer to the user input centroid 174, as compared to the liquid droplet centroid 178d. As a result, the confidence interval algorithm can provide location information of the liquid droplet centroid 178c to the electronic device 100. The electronic device 100 may use the location information of the liquid droplet centroid 178c as the location of the user input. In this regard, the liquid droplet centroid 178c may represent an updated user input, as the liquid droplet centroid 178c may be a revised user input as compared to that of the user input location 144 (shown in FIG. 10), with the location of the revised user input more accurately representing the location of the actual touch input by the user. Accordingly, the electronic device 100 may use both the display assembly 108 and the force detection assembly 114 to determine a location of the user input when liquid is present on the transparent layer 106 and detected by the display assembly 108. While FIGS. 10 and 11 show and describe the touch input component of the display assembly 108 determining a location of the liquid droplets, other implementations are possible. For example, the touch input component of the display assembly 108 can be configured to determine whether a liquid droplet(s) is/are present, as opposed to determining both the presence and location of liquid droplets. In other words, in some implementations, the touch input component of the display assembly 108 only determines whether or not liquid is present on the transparent layer 106. In this implementation, the force detection assembly 114 can determine the location of the user input location 144.

Figure 12:
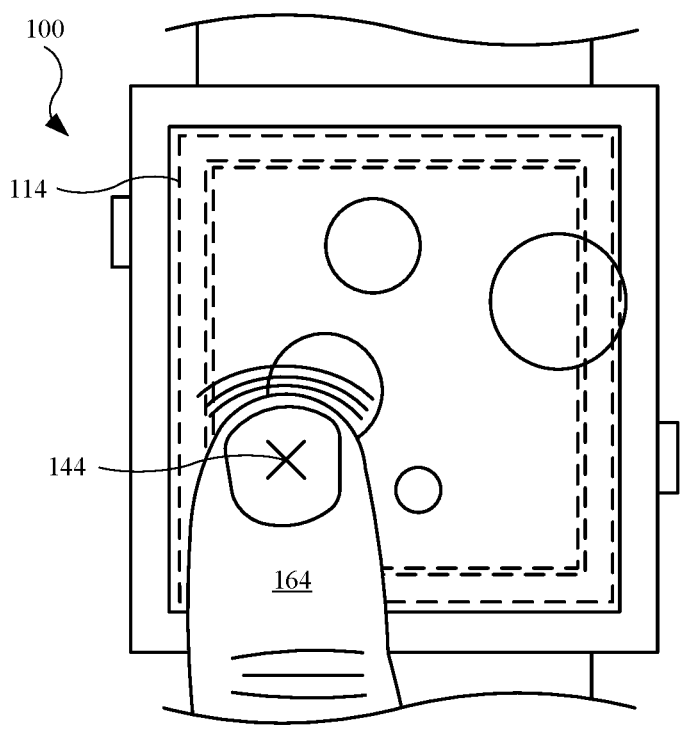
FIG. 12 illustrates a plan view that partially shows the electronic device, showing the user providing an increased applied force during interaction with the electronic device.
Figure 13:
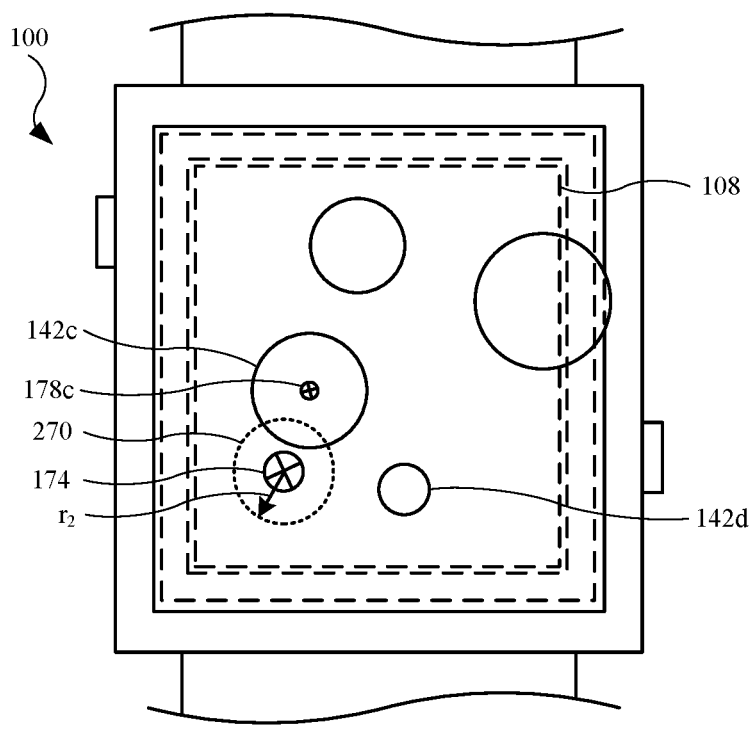
FIG. 13 illustrates a plan view that partially shows the electronic device, showing an updated confidence interval generated by the algorithm, in accordance with some described embodiments.

FIGS. 12 and 13 illustrate a scenario in which a user 164 provides a user input with a greater amount of applied force, as compared to scenario showed in FIGS. 10 and 11. FIG. 12 illustrates a plan view that partially shows the electronic device 100, showing the user 164 providing an increased applied force (denoted by several lines near the user 164) during interaction with the electronic device 100. As shown, the force detection assembly 114 determines the user input location 144 of the user 164.

FIG. 13 illustrates a plan view that partially shows the electronic device 100, showing an updated confidence interval generated by the confidence interval algorithm, in accordance with some described embodiments. As shown, the confidence interval algorithm (and/or another program) creates the user input centroid 174 and builds a confidence interval 270 around the user input centroid 174. Due to the increase applied force by the user 164 (as shown in FIG. 12), the electronic device 100 can determine, with greater accuracy, the location of the touch input. As a result, the confidence interval 270 includes a radius $r_2$, which is shorter than the radius $r_1$ (shown in FIG. 11), and the confidence interval 270 includes an area that is smaller than that of the confidence interval 170 (shown in FIG. 11). As shown in FIG. 13, an outer perimeter of the liquid droplet 142d is not within the confidence interval 270, and the liquid droplet 142c represents the only liquid droplet at least partially within the confidence interval 270. The confidence interval algorithm may generate the liquid droplet centroid 178c and the electronic device 100 may use the location information of the liquid droplet centroid 178c as the location of the user input, similar to a manner previously described. When fewer liquid droplets fall within a confidence interval 270 that is relatively smaller in area, the electronic device 100 may determine the location the touch input with relatively higher confidence.

FIGS. 12 and 13 illustrate a step for enhanced accuracy for locating the touch input. In this manner, a manufacturer of the electronic device 100 may notify users the providing a relatively higher applied force to the transparent layer 106 (without causing damage) can provide better accuracy for determining the location of the touch input.

In combination with using both a force detection assembly and a touch input component of a display assembly, the electronic device 100 can integrate additional features. For example, the electronic device 100 may incorporate a machine learning algorithm (or algorithms). The machine learning algorithm can be designed to receive information and data from other software applications and features from user interaction with the electronic device 100. The information and data may include frequency of use of software applications, location information (such as where the user used the software applications), and time/day information (such as when the user used the software applications), as non-limiting examples. Based on the received information and data, the machine learning algorithm can "learn" the user's behavior and predict an output from the behavior. The predicted output may include the software application the user intends to select/open when using the electronic device 100.

FIGS. 14-17 show examples of incorporating a machine learning algorithm with a touch input event to the display assembly 108 of the electronic device 100. When a user provides a touch input to the display assembly 108, the user intends some desired outcome. The desired outcome may include opening or closing a software application, as non-limiting examples. In this regard, when the force detection assembly 114 and the display assembly 108 (including a touch input component) determine the location of the touch input by a user to the display assembly 108, the machine learning algorithm may predict the software application the user intended to open or close. Accordingly, when the electronic device 100 determines the user's touch input corresponds to, for example, opening the software application and the machine learning algorithm predicts the same software application, the machine learning algorithm provides a confirmation to the electronic device 100 of the user's intent to open the software application. The machine learning algorithm may be beneficial during situations in which liquid droplets are on the transparent layer 106 and detected by the display assembly 108.

Figure 14:
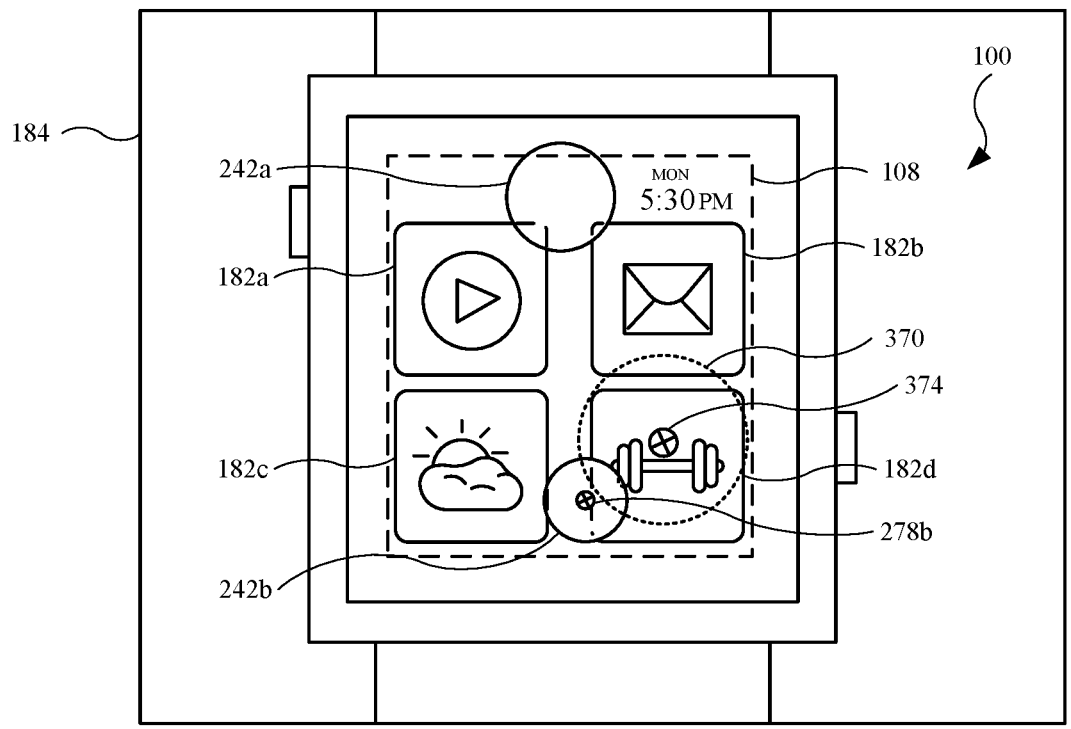
FIG. 14 illustrates a plan view partially showing the electronic device, showing the electronic device presenting several software applications on the display assembly, in accordance with some described embodiments.

FIG. 14 illustrates a plan view partially showing the electronic device 100, showing the electronic device 100 presenting several software applications on the display assembly 108, in accordance with some described embodiments. For purposes of simplicity, the force detection assembly 114 (shown in FIG. 3) is not shown. The display assembly 108 can present several icons, with each icon representing a software application that can be executed and presented on the display assembly 108. As shown, the display assembly 108 is presenting an icon 182a, an icon 182b, an icon 182c, and an icon 182d. Also, a liquid droplet 242a and a liquid droplet 242b are present on the transparent layer 106 and may be detected by the display assembly 108.

In the example, a user intends to select/open the icon 182d. As shown, the icon 182d represents a fitness/activity software application, which may include a calorie-burning software application or another fitness-related burning application. However, due in part to the liquid droplet 242a and the liquid droplet 242b, the display assembly 108 may not accurately locate the user's intended touch input to the icon 182d. In this regard, the force detection assembly 114 (not shown in FIG. 14) can determine a location of a touch input. The display assembly 108 can determine the locations and size of the liquid droplet 242a and the liquid droplet 242b. The confidence interval algorithm can use the location of the touch input to generate a user input centroid 374 and build a confidence interval 370 around the user input centroid 374. The confidence interval algorithm (and/or another program of the electronic device 100) can then determine whether the liquid droplet 242a and/or the liquid droplet 242b at least partially fall within the confidence interval 370.

As shown in FIG. 14, only the liquid droplet 242b falls at least partially within the confidence interval 370. Accordingly, the confidence interval algorithm can determine that the liquid droplet 242b is closer to the user input centroid 374, as compared to the liquid droplet 242a. The confidence interval algorithm can create a liquid droplet centroid 278b based upon the liquid droplet 242b and the droplet location information provided by the display assembly 108. As a result, the confidence interval algorithm may provide an input to the electronic device 100 that the location of the touch input corresponds to the location of the liquid droplet centroid 278b.

The location of the touch input, as determined by the confidence interval algorithm, may indicate the user intends to select/open the icon 182d. However, due in part to the liquid droplets, the determined location of the touch input may be accurate but with less confidence, or may not be accurate. In order to confirm the selection, the electronic device 100 may use the machine learning algorithm. For example, the machine learning algorithm can include a location-based machine learning algorithm that receives context-aware information, such as current location of the user's (or technically, current location of the electronic device 100). The machine learning algorithm can also receive historical information related to the software applications that the user uses at the current location (or within a radius around the current location), along with a ranking of the software applications. The ranking can include a list of the software application in descending order from most frequently used to least frequently used. The machine learning algorithm can also receive a list of software applications currently represented by an icon on the display assembly 108. In some instances, the machine learning algorithm may cross-reference and subsequently remove software applications from the ranked list if they do not appear on the list of software applications currently represented by an icon(s) on the display assembly 108, thereby reducing the number of possible software applications from which to select (and increasing the probability of correctly selecting the software application intended for selection by the user). Using this information, the machine learning algorithm can predict which software application the user intended to select, and accordingly, can predict which the icon to which the user intended to provide a user input.

In the example in FIG. 14, the current location 184 of the user is a fitness center, or gymnasium. The machine learning algorithm may receive the current location 184, along with the list of software applications used by the user, in a ranked order, at the current location 184. The machine learning algorithm can also receive a list of software applications, with each software application represented by one of the icon 182a, the icon 182b, the icon 182c, and the icon 182d. If, for example, the user uses a fitness-related software application, represented by the icon 182d, at the current location 184 more frequently than other software applications (including those represented by the aforementioned icons), the machine learning algorithm may predict the user intended to select the icon 182d. The electronic device 100 may receive the predicted information from the machine learning algorithm as a confirmation that the user intended to select the icon 182d, as determined by the confidence interval algorithm.

Figure 15:
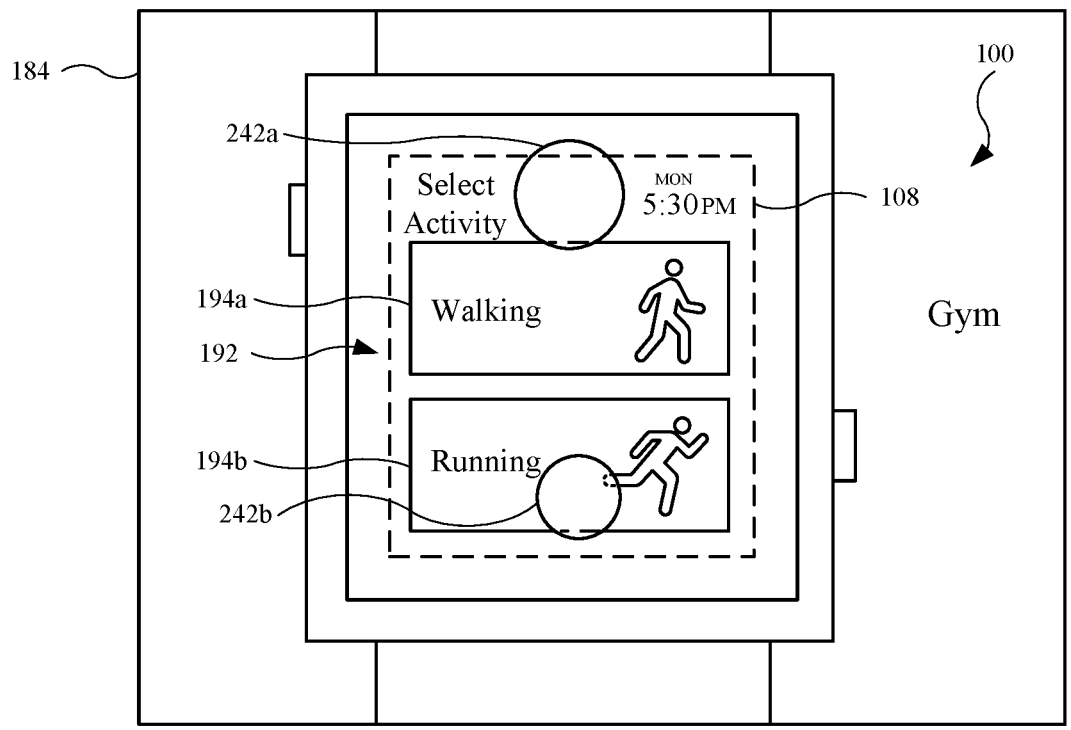
FIG. 15 illustrates a plan view of the electronic device, showing the display assembly 108 presenting a selected software application.

FIG. 15 illustrates a plan view of the electronic device 100, showing the display assembly 108 presenting a selected software application. The software application 192 is a fitness/activity software application represented by the icon 182d (shown in FIG. 14). The software application 192 includes several options for the user to choose from. For example, the software application 192 includes a walking option 194a and a running option 194b. Due to the presence of the liquid droplet 242a and the liquid droplet 242b, the electronic device 100 may subsequently require at least some combination the force detection assembly 114, the display assembly 108 (including the touch input component), the confidence interval algorithm, and the machine learning algorithm to predict which option the user selects from the software application 192. The process for determining a location of the touch input to the display assembly 108 to determine whether the walking option 194a and the running option 194b is selected can be repeated using the processes described above. In order to further predict a subsequent user selection, the machine learning algorithm may receive additional information, such as a ranking (in terms of frequency) of the type of activity (walking option 194a or running option 194b) the user selects from the software application 192 while at the current location 184, the type of activity most frequently used at the current time, and/or the type of activity most frequently used during the current day of the week.

Figure 16:
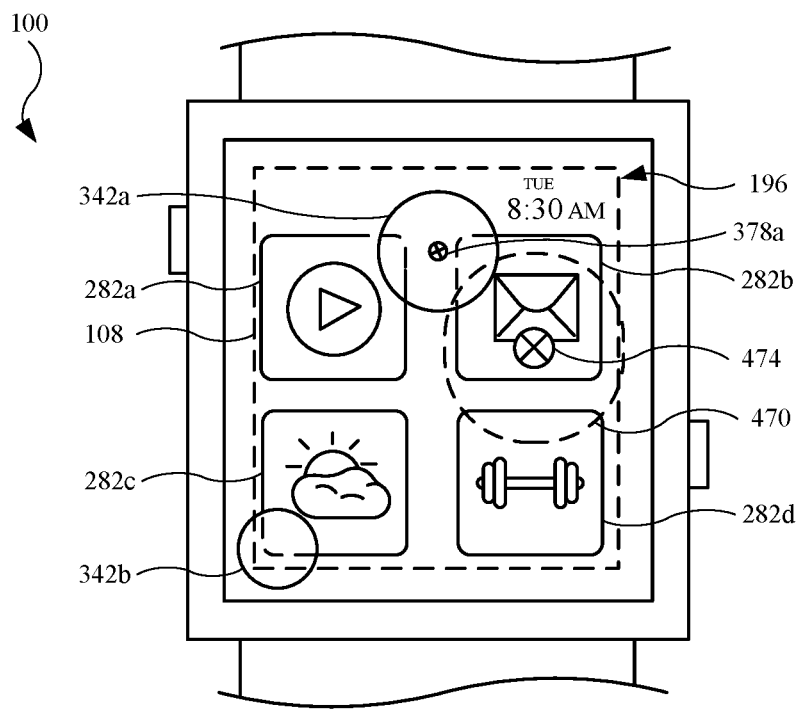
FIG. 16 illustrates a plan view partially showing the electronic device, showing the electronic device presenting several software applications on the display assembly, in accordance with some described embodiments.

FIG. 16 illustrates a plan view partially showing the electronic device 100, showing the electronic device 100 presenting several software applications on the display assembly 108, in accordance with some described embodiments. For purposes of simplicity, the force detection assembly 114 (shown in FIG. 3) is not shown. As shown, the display assembly 108 is presenting an icon 282a, an icon 282b, an icon 282c, and an icon 282d. The liquid droplet 342a and the liquid droplet 342b are again present on the transparent layer 106 and may be detected by the display assembly 108.

In the example, a user intends to select/open the icon 282d. As shown, the icon 282d represents an email software application. However, due in part to the liquid droplet 342a and the liquid droplet 342b, the display assembly 108 may not accurately the user's intended touch input to the icon 282d. In this regard, the force detection assembly 114 (not shown in FIG. 16) can determine a location of a touch input. The display assembly 108 can determine the locations and size of the liquid droplet 342a and the liquid droplet 342b. The confidence interval algorithm can use the location of the touch input to generate a user input centroid 474 and build a confidence interval 470 around the user input centroid 474. The confidence interval algorithm can then determine whether the liquid droplet 342a and/or the liquid droplet 342b at least partially fall within the confidence interval 370.

As shown in FIG. 16, only the liquid droplet 342b falls at least partially within the confidence interval 370. The confidence interval algorithm can determine that the liquid droplet 342a is closer to the user input centroid 474, as compared to the liquid droplet 342b. The confidence interval algorithm can create a liquid droplet centroid 378a based upon the liquid droplet 342b and the droplet location information provided by the display assembly 108. As a result, the confidence interval algorithm may provide an input to the electronic device 100 that the location of the touch input corresponds to the location of the liquid droplet centroid 378a.

The location of the touch input, as determined by the confidence interval algorithm, may indicate the user intends to select/open the icon 282b. However, as shown in FIG. 16, the liquid droplet centroid 378a is not overlapping the icon 282b. Accordingly, due in part to the liquid droplets, the determined location of the touch input may be accurate but with less confidence, or may not be accurate. In order to confirm the selection, the electronic device 100 may again use the machine learning algorithm. The machine learning algorithm can include a time-based machine learning algorithm that receives context-aware information, such as the current time. The machine learning algorithm can also receive historical information related to the software applications that the user uses at the current time (or within a time interval around the current time), along with a ranking of the software applications. The ranking can include a list of the software application in descending order from most frequently used to least frequently used. The machine learning algorithm can also receive a list of software applications currently represented by an icon on the display assembly 108. In some instances, the machine learning algorithm may cross-reference and subsequently remove software applications from the ranked list if they do not appear on the list of software applications currently represented by an icon(s) on the display assembly 108, thereby reducing the number of possible software applications from which to select (and increasing the probability of correctly selecting the software application intended for selection by the user). Using this information, the machine learning algorithm can predict which software application the user intended to select, and accordingly, can predict which the icon to which the user intended to provide a user input.

In the example in FIG. 16, the current time 196 is displayed on the display assembly 108. The machine learning algorithm may receive the current time 196, along with the list of software applications, in ranked order, used by the user at the current time 196. The machine learning algorithm can also receive a list of software applications, with each software application represented by one of the icon 282a, the icon 282b, the icon 282c, and the icon 282d. If, for example, the user uses an email software application, represented by the icon 282b, at the current time 196 more frequently than other software applications (including those represented by the aforementioned icons), the machine learning algorithm may predict the user intended to select the icon 282b. The electronic device 100 may receive the predicted information from the machine learning algorithm as a confirmation that the user intended to select the icon 282b, as determined by the confidence interval algorithm.

Figure 17:
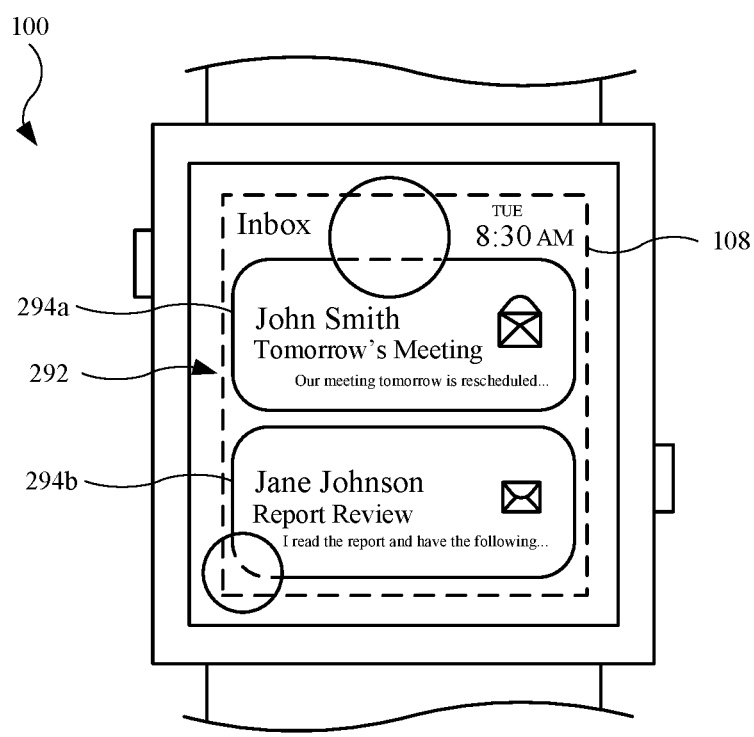
FIG. 17 illustrates a plan view of the electronic device, showing the display opening a selected software application subsequent to a touch input.

FIG. 17 illustrates a plan view of the electronic device 100, showing the display assembly 108 presenting a selected software application. The software application 292 is an email software application represented by the icon 282b (shown in FIG. 16). The software application 292 includes several options for the user to choose from. For example, the software application 292 includes an email icon 294a and an email icon 294b, with each email icon represent an email that can be selected and read by the user. Due to the presence of the liquid droplet 342a and the liquid droplet 342b, the electronic device 100 may subsequently require at least some combination of the force detection assembly 114, the display assembly 108 (including the touch input component), the confidence interval algorithm, and the machine learning algorithm to predict which option the user selects from the software application 292. The process for determining a location of the touch input to the display assembly 108 to determine whether the email icon 294a and the email icon 294b is selected can be repeated using the processes described above.

While FIGS. 14-17 provide examples in which the electronic device 100 uses the machine learning algorithm in conjunction with both the force detection assembly 114 and the touch input component of the display assembly 108 to determine a location of a touch input, the electronic device 100 may rely upon fewer inputs. For example, in some implementations, the machine learning algorithm is used with the touch input component of the display assembly 108 to determine a location of the touch input, and any information provided by the force detection assembly 114 is not used to determine the location. For example, when the location is determined by the touch input component of the display assembly 108, the machine learning algorithm can predict the software application and can act as a confirmation of the selected software application based on touch input information provided by the touch input component of the display assembly 108. Also, the example scenarios provided in FIGS. 14-17 are not intended to be limiting. The machine learning algorithm may be implemented to predict different user preferences as a confirmation to the location of the touch input. For example, when using a media player software application (represented by the icon 282a in FIG. 16), the electronic device 100 can use the machine learning algorithm to predict a volume setting of a speaker module (not shown in FIGS. 14-17) of the electronic device 100 based upon the current location of the user and/or the current time of day. When the electronic device 100 includes communication capability with other users, the electronic device 100 can use the machine learning algorithm to predict which of the other users that the user intends to contact based upon, for example, the current location of the user, the current day, and/or the current time of day. When the electronic device 100 includes an accelerometer, the accelerometer can determine whether the user of the electronic device 100 is accelerating or decelerating, the electronic device 100 can use the machine learning algorithm to predict a particular type of fitness-related activity, based on the acceleration or deceleration. When the electronic device 100 includes wireless capabilities, the electronic device 100 can receive weather-related information (such as rain, high temperatures, low temperatures, humidity, snow, high winds, as non-limiting examples). In this regard, the electronic device 100 can use the machine learning algorithm to predict a weather software application. In the foregoing examples, the machine learning algorithm can be used in conjunction with information provided by the force detection assembly and/or the touch input component of the display assembly.

Figure 18:
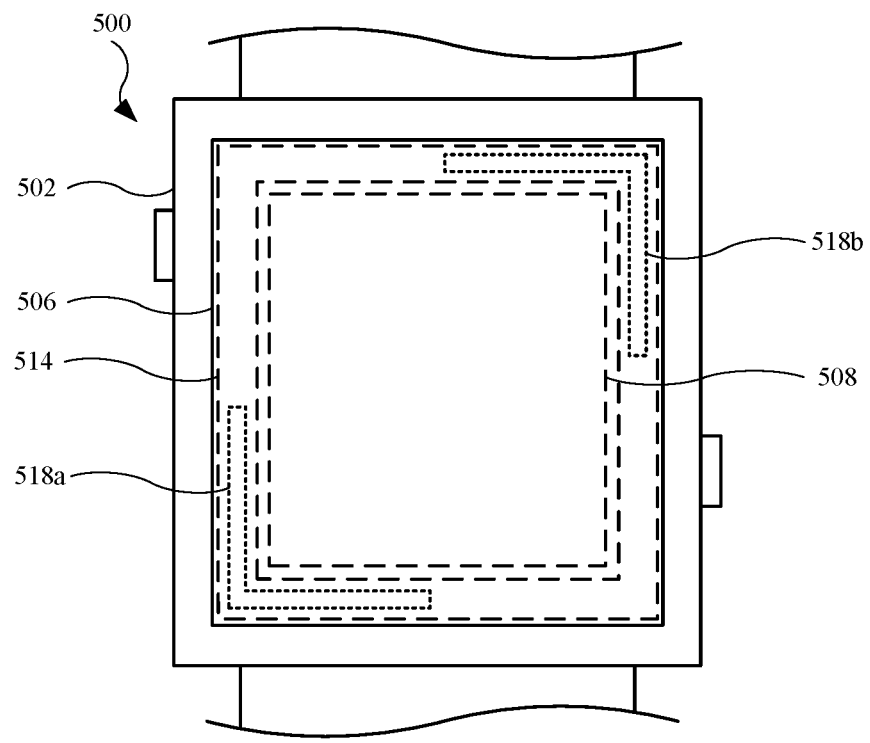
FIG. 18 illustrates a plan view that partially shows an alternate embodiment of an electronic device, showing an alternate embodiment of a force detection assembly.
Figure 19:
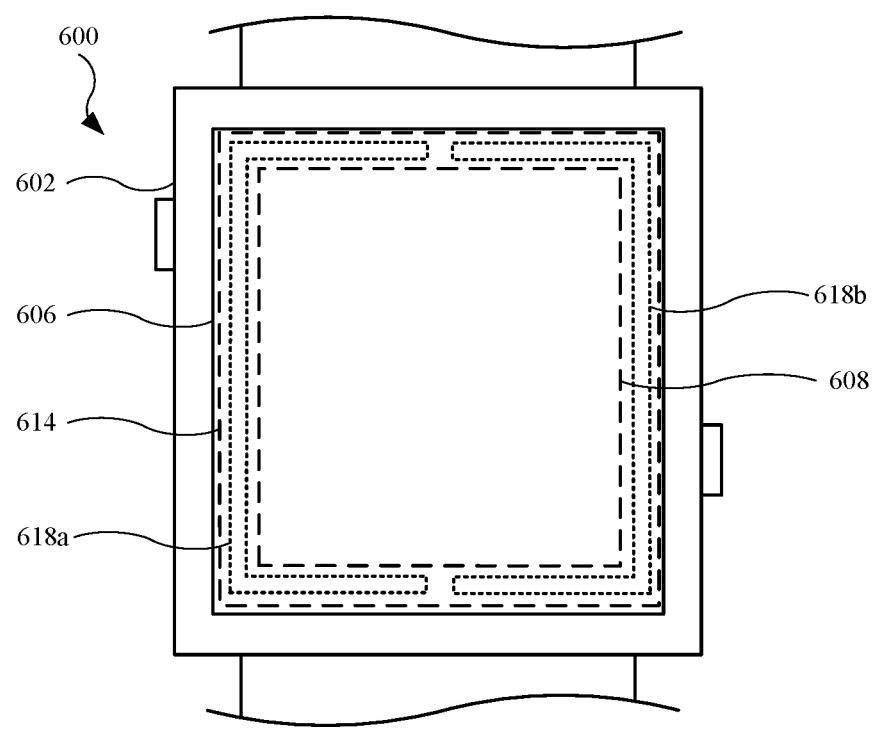
FIG. 19 illustrates a plan view that partially shows an alternate embodiment of an electronic device, showing an alternate embodiment of a force detection assembly.

FIGS. 18 and 19 show different configurations of a force detection assembly in an electronic device. It should be noted that the electronic devices shown in FIGS. 18 and 19 may include any features described herein for an electronic device.

FIG. 18 illustrates a plan view that partially shows an alternate embodiment of an electronic device 500, showing an alternate embodiment of a force detection assembly 514. As shown, the electronic device 500 may include an enclosure 502 and a transparent layer 506 coupled to the enclosure 502. The force detection assembly 514 may surround a display assembly 508. The force detection assembly 514 may include a force detection unit 518a along a corner of the enclosure 502, and a force detection unit 518b along a corner of the enclosure 502. The corners along which the force detection units are located may include opposing corners. However, other configurations are possible. The force detection units may include multiple electrode layers that form several capacitors, similar to force detection units previously described.

FIG. 19 illustrates a plan view that partially shows an alternate embodiment of an electronic device 600, showing an alternate embodiment of a force detection assembly 614. As shown, the electronic device 600 may include an enclosure 602 and a transparent layer 606 coupled to the enclosure 602. The force detection assembly 614 may surround a display assembly 608. The force detection assembly 614 may include a force detection unit 618a along one half of the enclosure 602, and a force detection unit 618b along the other half of the enclosure 602. As shown, the halves along which the force detection units are located may include a "left-right" pair. However, other configurations are possible. The force detection units may include multiple electrode layers that form several capacitors, similar to force detection units previously described.

The force detection assemblies shown in FIGS. 18 and 19 may be able to determine a location of a touch input to within one of four quadrants of the display assembly, despite a reduced number of force detection units as compared to a prior embodiment.

Figure 20:
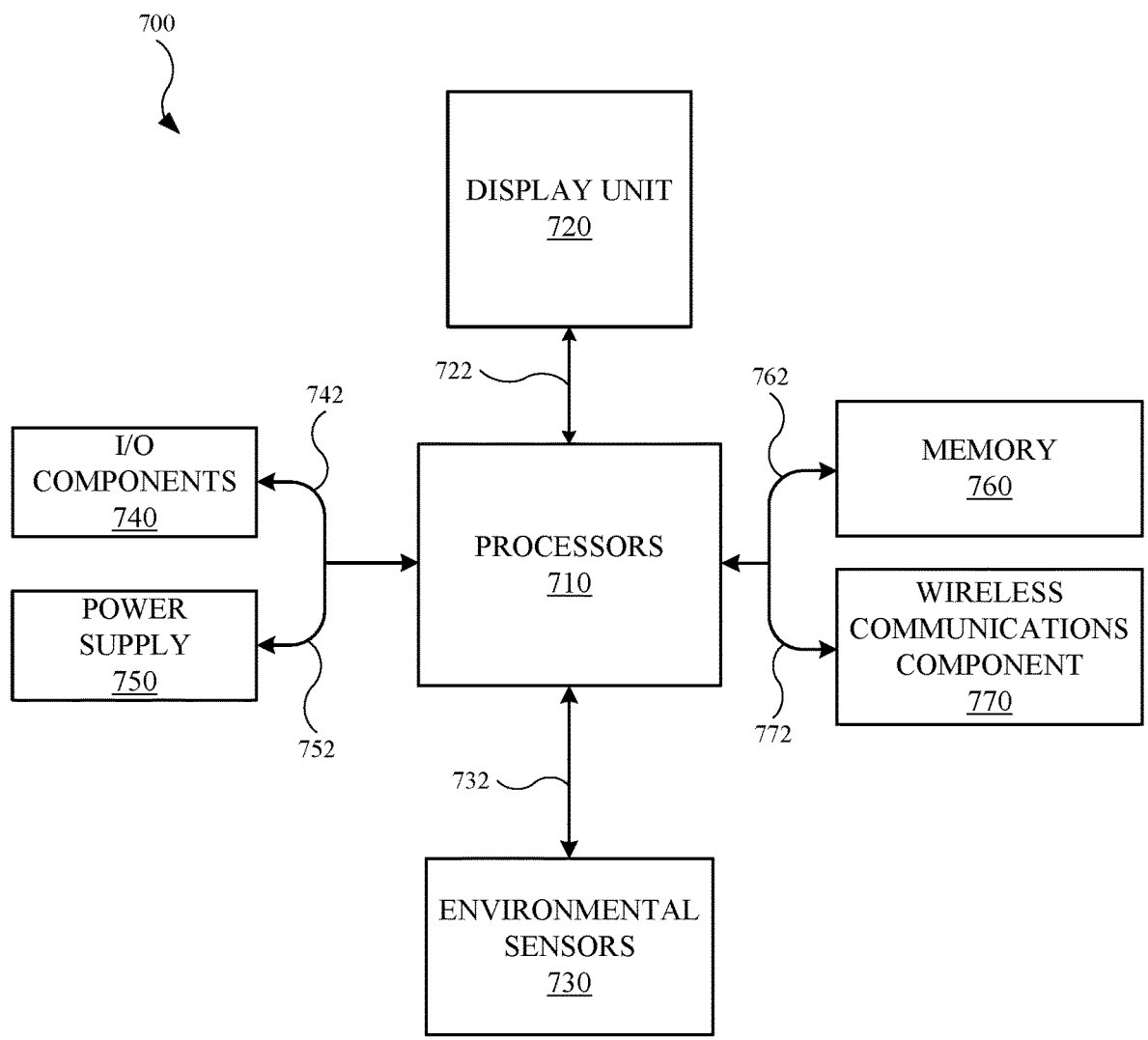
FIG. 20 illustrates a block diagram of a portable electronic device, in accordance with some described embodiments.

FIG. 20 illustrates a block diagram of a portable electronic device 700, in accordance with some embodiments. The portable electronic device 700 is capable of implementing the various techniques described herein. The portable electronic device 700 may include any features described herein for an electronic device. Also, electronic devices described herein may include any feature or features described for the portable electronic device 700. In some embodiments, the portable electronic device 700 takes the form of the electronic device 100 (shown in FIG. 1). The portable electronic device 700 can include one or more processors 710 for executing functions of the portable electronic device 700. The one or more processors 710 can refer to at least one of a central processing unit (CPU) and at least one microcontroller for performing dedicated functions.

According to some embodiments, the portable electronic device 700 can include a display unit 720. The display unit 720 is capable of presenting a user interface that includes icons (representing software applications), textual images, and/or motion images. In some examples, each icon can be associated with a respective function (such as a software application) that can be executed by the one or more processors 710. In some cases, the display unit 720 includes a display layer (not illustrated), which can include a liquid-crystal display (LCD), light-emitting diode display (LED), organic light-emitting diode display (OLED), or the like. According to some embodiments, the display unit 720 includes a touch input detection component and/or a force detection assembly that can be configured to detect changes in an electrical parameter (e.g., electrical capacitance value) when the user's appendage (acting as a capacitor) comes into proximity with the display unit 720 (or in contact with a transparent layer that covers the display unit 720). The display unit 720 is connected to the one or more processors 710 via one or more connection cables 722.

According to some embodiments, the portable electronic device 700 can include one or more environmental sensors 730 capable of detecting environmental conditions that are present within, or general proximate to, the portable electronic device 700. In some examples, the one or more environmental sensors 730 may include a humidity sensor, a temperature sensor, a liquid sensor, an ambient pressure sensor, underwater depth sensor, a magnetic field sensor, a strain gage, a capacitive sensor, a barometer, a microphone, and/or a thermometer. In some embodiments, the one or more environmental sensors 730 can determine whether the portable electronic device 700 is exposed to a specific environmental stimulus (e.g., moisture). In response, the one or more processors 710 can modify a notification that is presented by the display unit 720 that corresponds to the specific environmental stimulus. The one or more environmental sensors 730 is/are connected to the one or more processors 710 via one or more connection cables 732.

According to some embodiments, the portable electronic device 700 can include one or more input/output components 740 (also referred to as "I/O components") that enable communication between a user and the portable electronic device 700. In some cases, the one or more input/output components 740 can refer to a button or a switch that is capable of actuation by the user. In some cases, the one or more input/output components 740 can refer to a soft key that is flexibly programmable to invoke any number of functions. In some examples, the one or more input/output components 740 can refer to a switch having a mechanical actuator (e.g., spring-based switch, slide-switch, rocker switch, rotating dial, etc.) or other moving parts that enable the switch to be actuated by the user. In some examples, the one or more input/output components 740 can include a capacitive switch that is integrated with the display unit 720. Also, the one or more input/output components 740 can include a force detect assembly that includes several force detection units, each of which is designed to detection an amount of applied force (by, for example, a touch input) to the display unit 720. The one or more input/output components 740 can include accelerometer that determine whether the portable electronic device 700, and to what extent, is accelerating or decelerating. When the one or more input/output components 740 are used, the input/output components 740 can generate an electrical signal that is provided to the one or more processors 710 via one or more connection cables 742.

According to some embodiments, the portable electronic device 700 can include a power supply 750 that is capable of providing energy to the operational components of the portable electronic device 700. In some examples, the power supply 750 can refer to a rechargeable battery. The power supply 750 can be connected to the one or more processors 710 via one or more connection cables 752. The power supply 750 can be directly connected to other devices of the portable electronic device 700, such as the one or more input/output components 740. In some examples, the portable electronic device 700 can receive power from another power sources (e.g., an external charging device) not shown in FIG. 20.

According to some embodiments, the portable electronic device 700 can include memory 760, which can include a single disk or multiple disks (e.g., hard drives), and includes a storage management module that manages one or more partitions within the memory 760. In some cases, the memory 760 can include flash memory, semiconductor (solid state) memory or the like. The memory 760 can also include a Random Access Memory (RAM) and a Read-Only Memory (ROM). The ROM can store programs, utilities or processes to be executed in a non-volatile manner. The RAM can provide volatile data storage, and stores instructions related to the operation of the portable electronic device 700. In some embodiments, the memory 760 refers to a non-transitory computer readable medium, where an operating system (OS) is established at the memory 760 that can be configured to execute software applications, confidence interval algorithms, and/or machine learning algorithms that are stored at the memory 760. The one or more processors 710 can also be used to execute software applications, confidence interval algorithms, and/or machine learning algorithms that are stored at the memory 760. In some embodiments, a data bus 762 can facilitate data transfer between the memory 760 and the one or more processors 710.

According to some embodiments, the portable electronic device 700 can include a wireless communications component 770. A network/bus interface 772 can couple the wireless communications component 770 to the one or more processors 710. The wireless communications component 770 can communicate with other electronic devices via any number of wireless communication protocols, including at least one of a global network (e.g., the Internet), a wide area network, a local area network, a wireless personal area network (WPAN), or the like. In some examples, the wireless communications component 770 can transmit data to the other electronic devices over IEEE 802.11 (e.g., a Wi-Fi® networking system), Bluetooth (IEEE 802.15.1), ZigBee, Wireless USB, Near-Field Communication (NFC), a cellular network system (e.g., a 3G/4G/5G network such as UMTS, LTE, etc.), or the like.

Figure 21:
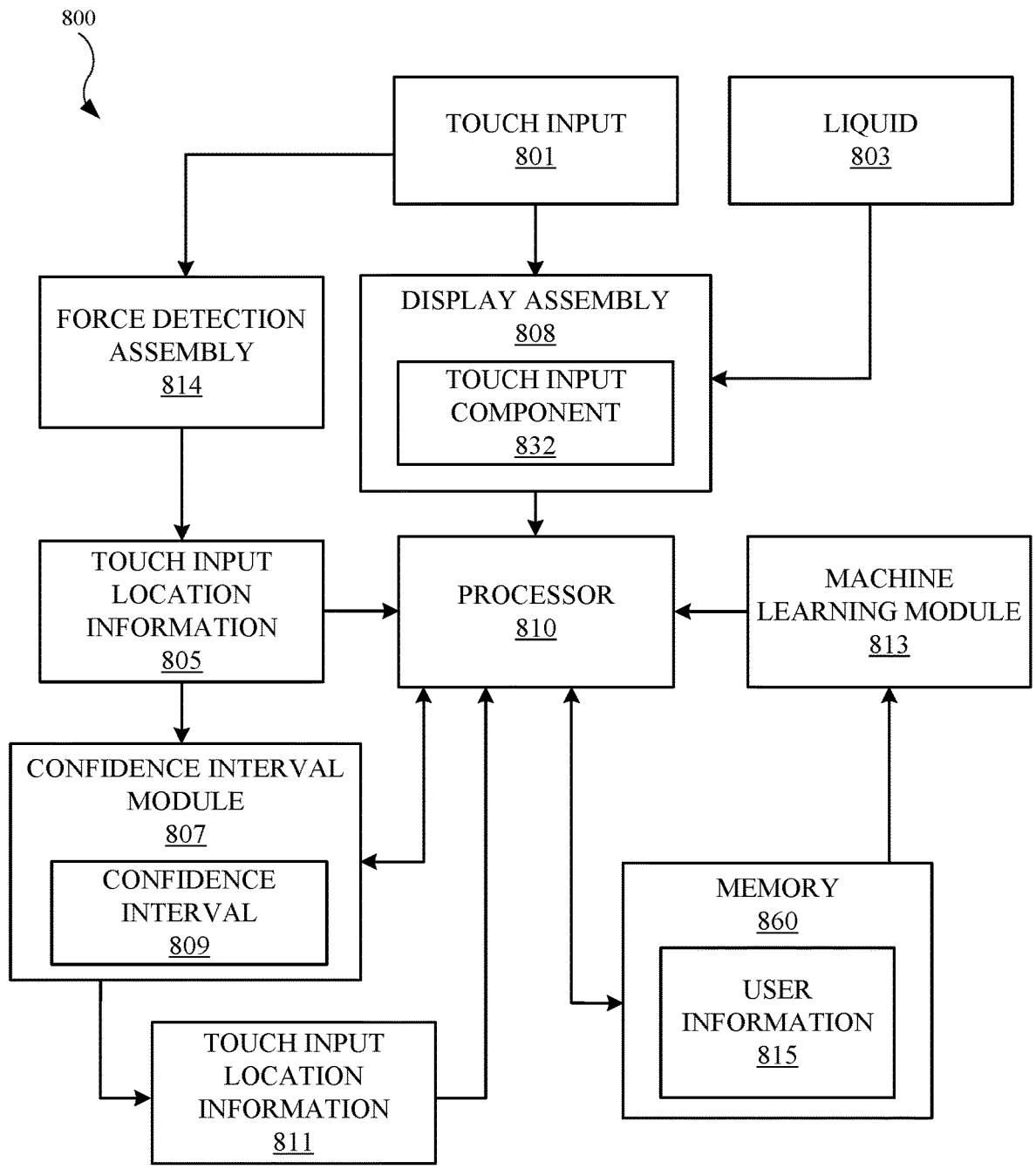
FIG. 21 illustrates a block diagram of an electronic device, showing several inputs and associated outputs generated based on the inputs used to locate a touch input to the electronic device, in accordance with some described embodiments.

FIG. 21 illustrates a block diagram of an electronic device 800, showing several inputs and associated outputs generated based on the inputs used to locate a touch input to the electronic device 800, in accordance with some described embodiments. The inputs and associated outputs may enable the electronic device 800 to locate a touch input 801 to a display assembly 808, including instances in which a touch input component 832 of the display assembly 808 detects liquid 803 (which may include one or more liquid droplets).

When the display assembly 808 receives the touch input 801, a force detection assembly 814 can determine an amount of applied force from the touch input 801. The force detection assembly 814 may include one or more force detection units, as previously described. In addition to determining the amount of applied force, the force detection assembly 814 can also determine a location of the touch input 801, through capacitance and/or differential capacitance information from the force detection units. In the regard, the force detection assembly 814 can provide touch input location information 805 to a processor 810. The touch input location information 805 may be referred to as a first, or initial, location of the touch input 801.

In some instances, the touch input component 832 detects the liquid 803 and subsequently deactivates, and the touch input location information 805 provided by the force detection assembly 814 is used to locate the touch input 801. However, in other instances, the touch input component 832 remains active and determines the location of the liquid 803. In this manner, the electronic device 800 may include a confidence interval module 807 designed to execute instructions of a confidence interval algorithm. The confidence interval module 807 can use the location of the touch input 801, as determined by the touch input location information 805, and create a user input centroid to represent the first location of the touch input 801. The confidence interval module 807 can build a confidence interval 809 around the user input centroid, and determine (using the touch input component 832) whether any droplet(s) of the liquid 803 are within (or at least partially within) the confidence interval 809. The confidence interval module 807 can build a liquid droplet centroid for each droplet of the liquid 803 determined to be within (or at least partially within) the confidence interval 809, and evaluate which liquid droplet centroid is closest to the user input centroid. The confidence interval module 807 can use the location of the liquid droplet centroid that is closest to the user input centroid as a location of the touch input 801, and can provide this information as touch input location information 811 to the processor 810. The touch input location information 811 may be referred to as a second, updated, or revised, location of the touch input 801. Further, the touch input location information 811 may provide a more accurate determination of the location of the actual touch input by the user, as compared to the location based on the touch input location information 805 from the force detection assembly 814.

In some instances, the electronic device 800 includes a machine learning module 813 designed to execute instructions of a machine learning algorithm. The machine learning module 813 may access user information 815 to predict a software application (or an icon that represents the software application) the user intended to select/open by the touch input 801. The user information 815 may include historical data related to use of software applications on the electronic device 800 by the user. The user information 815 may include which software application(s) are used at a current location of the electronic device 800 and/or at a current time and day, as non-limiting examples. When multiple software applications result, the multiple software applications can be ranked by frequency of use at the current location and/or at the current day and time. Given this information along with current location of the electronic device 800 and/or current time and day information, the machine learning module 813 can predict which software application the user intended to select by touch input 801. Accordingly, the machine learning module 813 may provide a confirmation that the touch input 801 was correctly located (using the force detection assembly 814 or the confidence interval module 807) on the display assembly 808 to select the icon, and ultimately select the software application to user intended to use.

In some instances, the location of the touch input, as determined by the confidence interval algorithm, may provide a confirmation that the machine learning module 813 correctly predicts the software application selected by the user. For example, when the location of the touch input 801, as determined by the confidence interval module 807, causes a selection of an icon that opens the software application predicted by machine learning module 813, the electronic device 800 can determine with relatively high confidence that the intended software application to be opened is correct.

Figure 22:
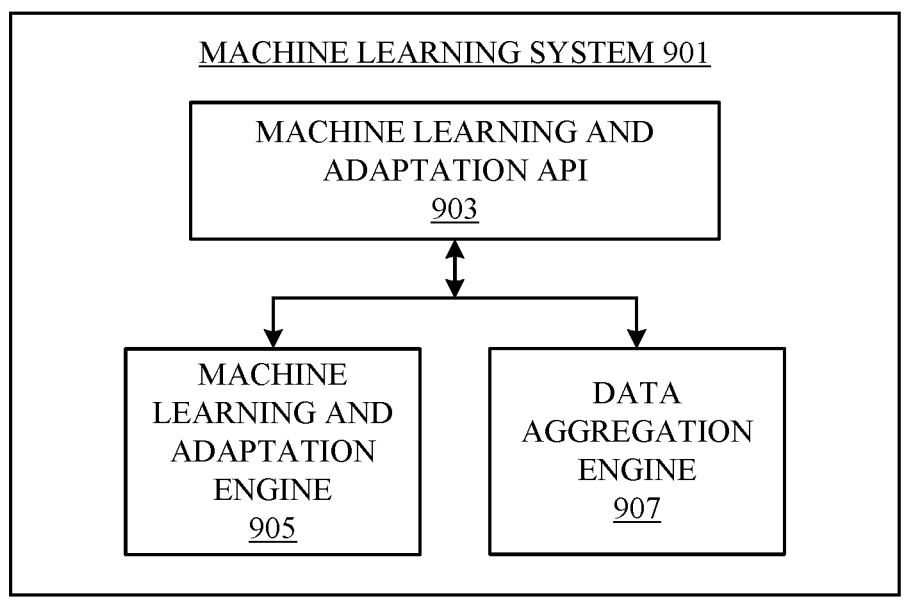
FIG. 22 illustrates a schematic diagram of a machine learning algorithm, in accordance with some described embodiments.

FIG. 22 illustrates a schematic diagram of a machine learning system 901, in accordance with some described embodiments. The machine learning system 901 can communicate with software application stored on an electronic device described herein. Further, the machine learning system 901 can receive location information, as well as day and time information. The machine learning system 901 may include a machine learning algorithm that is stored on the memory 760 (shown in FIG. 20). The machine learning system 901 may access information from the machine learning system 901.

The machine learning system 901 may include a machine learning and adaption application program interface ("API") 903. The machine learning and adaption API 903 may interface with machine learning and adaption techniques and exchanges data and information with the machine learning system 901.

The machine learning system 901 may include a machine learning and adaption application engine 905 that learn from information received by the machine learning system 901. The machine learning and adaption application engine 905 can classify the received data and information from software applications, classify and rank the data information by, for example, frequency of use of the software application, and predict a software application that the user intends to select.

The machine learning system 901 may include a data aggregation engine 907. The data aggregation engine 907 can aggregate and/or combine data from applications and store the data and make the data accessible to the machine learning and adaption application engine 905.

Figure 23:
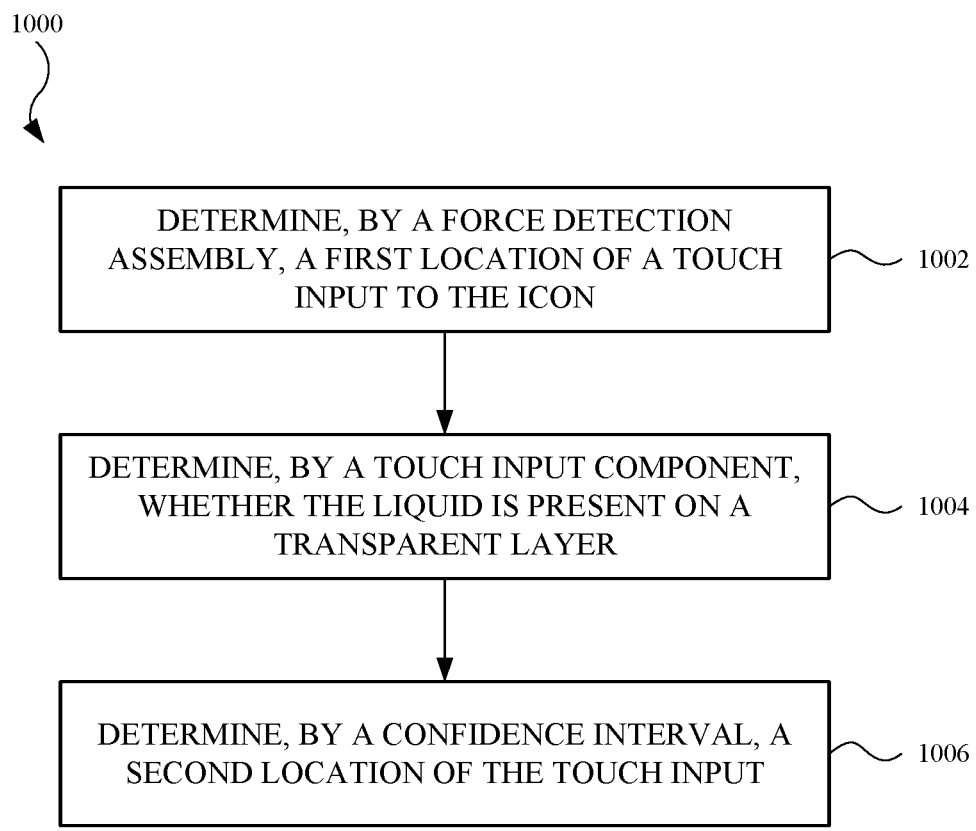
FIG. 23 illustrates a flowchart showing a method for selecting an icon on a display layer of a wearable electronic device when a liquid is present, in accordance with some described embodiments.

FIG. 23 illustrates a flowchart 1000 showing a method for selecting an icon on a display assembly of a wearable electronic device when a liquid is present, in accordance with some described embodiments. The liquid may be in the form of one or more liquid droplets located over the display assembly and positioned on a transparent layer that covers and protects the display assembly.

In step 1002, a force detection assembly is used to determine a first location of a touch input to the icon. The force detection assembly is configured to detect an amount of force by the touch input. The force detection assembly may include force detection units that include electrode layers that form several capacitors. The gap, or distance, between electrode layers may change when the force is applied to the touch input, which may change the capacitance across each force detection unit. Also, different force detection units may form difference capacitance levels, and a differential capacitance between the different force detection units can be used to determine the first location of the touch input.

In step 1004, a touch input component of the display assembly is used to determine whether the liquid is present. The may include a determination whether the liquid is present on a transparent layer that covers the display assembly. Moreover, the determination whether the liquid is present on the transparent layer may include a determination whether one or more liquid droplets are present on the transparent layer. The touch input component may include capacitance technology designed to generate an electrostatic field. The electrostatic field may be altered at a location corresponding to the touch input, as well as a location (or locations) corresponding to the liquid droplet(s).

In step 1006, a confidence interval is used to determine a second location of the touch input. The confidence interval can use the first location and the determination of the presence of the liquid to determine the second location. The confidence interval can create a user input location based upon the first location. The confidence interval can build a confidence interval around the user input location. Further, when it is determined that multiple liquid droplets are present on the transparent layer, the confidence interval can determine whether a liquid droplet(s) falls within, or at least partially within, the confidence interval. The confidence interval can select, as a second location of the touch input, the liquid droplet that is closer (or closest) to the user input location. In some instances, the second location represents a more accurate representation of the touch input, as desired by the user.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable electronic device, comprising:
    a transparent layer;
    a display assembly covered by the transparent layer, the display assembly comprising a touch input component to determine whether a liquid is in contact with the transparent layer;
    a force detection assembly to determine a first location of a touch input having an input location on the transparent layer and an amount of force applied to the transparent layer from the touch input;
    a memory circuit;
    a confidence interval algorithm stored on the memory circuit that, when accessed by a processor, generates a confidence interval centered around the first location and determines a second location of the touch input based on the first location when the liquid is in contact with the transparent layer within the confidence interval, the confidence interval including a circular area of the transparent layer, the area having a radius, wherein the size of the radius is at least partially based on the amount of force applied to the transparent layer; and
    a machine learning algorithm stored on the memory circuit that, when accessed by the processor, generates a list of predicted user requests, determines whether a user request corresponding to the second location is on the list, and instructs the processor to execute the user request in response to determining the user request is on the list.

2. The wearable electronic device of claim 1, wherein the second location defines a user input to the display assembly that selects an icon presented on the display assembly.

3. The wearable electronic device of claim 1, wherein the force detection assembly comprises:
    a first force detection unit that measures a first capacitance based upon the amount of applied force; and a second force detection unit that measures a second capacitance based upon the amount of applied force, wherein the first location is determined by a differential capacitance between the first capacitance and the second capacitance.

4. The wearable electronic device of claim 1, further comprising:
an enclosure that is coupled with the transparent layer; and
a first band and a second band, the first band and the second band connected to the enclosure and configured to secure the enclosure to a user.

5. The wearable electronic device of claim 1, wherein the liquid comprises multiple liquid droplets, and wherein the confidence interval algorithm determines the second location when at least one liquid droplet is within the confidence interval.

6. The wearable electronic device of claim 5, wherein the confidence interval algorithm determines a location of a liquid droplet that is closest to the first location, and determines the second location as the location of the liquid droplet.

7. The wearable electronic device of claim 1, wherein the force detection assembly is adhesively coupled to the transparent layer.

8. The wearable electronic device of claim 1, wherein the machine learning algorithm generates the list of predicted user requests based on at least one of a location of the wearable electronic device, a state of acceleration of the wearable electronic device, or weather-related information.

9. The wearable electronic device of claim 1, wherein the radius of the confidence interval is inversely proportional to the amount of force applied to the transparent layer.

10. A wearable electronic device, comprising:
an enclosure;
a display assembly comprising a display layer to display icons that represent software applications and a touch input component that detects an input location of a user touch input;
a confidence interval algorithm to generate a confidence interval including an area of the display assembly centered around the input location and having a radius, and determine a second location based on a location of a liquid that at least partially covers the display assembly as detected by the touch input component when the location of the liquid is at least partially within the confidence interval; and
a machine learning algorithm to generate a list of predicted software applications, the machine learning algorithm confirming that an icon corresponding to the second location is associated with a software application on the list of predicted software applications.

11. The wearable electronic device of claim 10, further comprising:
a transparent layer coupled to the enclosure and covering the display assembly; and
a force detection assembly to determine an amount of applied force from the user touch input.

12. The wearable electronic device of claim 11, wherein the force detection assembly comprises:
a first force detection unit that measures a first capacitance based upon an amount of applied force by the user touch input, and
a second force detection unit that measures a second capacitance based upon the amount of applied force, wherein the input location is determined by a differential capacitance between the first capacitance and the second capacitance.

13. The wearable electronic device of claim 12, wherein the display layer is positioned between the first force detection unit and the second force detection unit.

14. The wearable electronic device of claim 10, wherein the enclosure defines an internal volume encompassing:
a processor circuit that executes instructions of the confidence interval algorithm and the machine learning algorithm; and
a memory circuit that stores the instructions of the confidence interval algorithm and the machine learning algorithm.

15. A method for selecting an icon on a display assembly of a wearable electronic device when a liquid is present on the display assembly, the method comprising:
determining, by a force detection assembly, a first location of a touch input on the display assembly and an amount of force applied to the display assembly by the touch input;
determining, by a touch input component of the display assembly, the presence of the liquid on a transparent layer that covers the display assembly;
determining, by a confidence interval algorithm, a second location of the touch input based on confidence interval surrounding the first location, the confidence interval including a circular area centered around the first location and having a radius, and the determination of the presence the liquid; and
confirming, by a machine learning algorithm, that the second location is closer to an icon selection associated with an input location than the first location based on whether a software application associated with the icon selection is on a list of predicted software applications generated by the machine learning algorithm.

16. The method of claim 15, wherein determining, by the confidence interval algorithm, the second location of the touch input comprises:
generating a user input location based on the first location;
generating a confidence interval around the user input location; and
determining whether the liquid is present at least partially within the confidence interval.

17. The method of claim 16, wherein the second location corresponds to a location of the liquid.

* * * * *